(12) United States Patent
Masubuchi et al.

(10) Patent No.: US 12,441,662 B2
(45) Date of Patent: Oct. 14, 2025

(54) SINTERED BODY, METHOD FOR PRODUCING SAME, AND DIELECTRIC COMPOSITION

(71) Applicants: National University Corporation Hokkaido University, Sapporo (JP); Murata Manufacturing Co., Ltd., Nagaokakyo (JP)

(72) Inventors: Yuji Masubuchi, Sapporo (JP); Akira Hosono, Sapporo (JP); Shinichi Kikkawa, Suita (JP); Masashi Inoguchi, Nagaokakyo (JP)

(73) Assignees: National University Corporation Hokkaido University, Sapporo (JP); Murata Manufacturing Co., Ltd, Nagaokakyo (JP)

( * ) Notice: Subject to any disclaimer, the term of this patent is extended or adjusted under 35 U.S.C. 154(b) by 718 days.

(21) Appl. No.: 17/690,528

(22) Filed: Mar. 9, 2022

(65) Prior Publication Data

US 2022/0194861 A1    Jun. 23, 2022

Related U.S. Application Data

(63) Continuation of application No. PCT/JP2020/034471, filed on Sep. 11, 2020.

(30) Foreign Application Priority Data

Sep. 12, 2019   (JP) ................................. 2019-166041

(51) Int. Cl.
  *C04B 35/58* (2006.01)
  *B01J 27/24* (2006.01)
  (Continued)

(52) U.S. Cl.
  CPC ......... *C04B 35/58007* (2013.01); *B01J 27/24* (2013.01); *B01J 35/39* (2024.01);
  (Continued)

(58) Field of Classification Search
  CPC .......... C04B 35/58007; C04B 35/6303; C04B 35/645; C04B 2235/3856;
  (Continued)

(56) References Cited

U.S. PATENT DOCUMENTS 3,577,245 A     5/1971  Quandt
2011/0278940 A1  11/2011 Krishna et al.
(Continued)

FOREIGN PATENT DOCUMENTS

JP   S63265866 A   11/1988
JP   H04193763 A    7/1992
(Continued)

OTHER PUBLICATIONS

Yuya Suemoto et al.; "Intergrowth between the Oxynitride Perovskite SrTaO2N and the Ruddlesden-Popper Phase Sr2TaO3N"; Inorg. Chem., 2018, vol. 57, p. 9086-9095.
(Continued)

*Primary Examiner* — Patricia L. Hailey
(74) *Attorney, Agent, or Firm* — ArentFox Schiff LLP

(57) ABSTRACT

A sintered body containing polycrystalline grains of a metal oxynitride containing at least two metal elements, wherein Ba and at least one metal element of a crystal phase of the sintered body are contained in a triple point that is not a void between the polycrystalline grains. A method for producing the sintered body includes sintering a mixture of at least a metal oxynitride as a main component and a sintering aid containing cyanamide in an atmosphere containing nitrogen or a rare gas or in a reduced-pressure atmosphere of 10 Pa or less while applying a mechanical pressure with a retention (Continued)

time at a maximum heating temperature during the sintering set to 1 minute to 10 minutes.

21 Claims, 12 Drawing Sheets

(51) Int. Cl.
| | |
|---|---|
| *B01J 35/39* | (2024.01) |
| *B01J 35/40* | (2024.01) |
| *B01J 35/73* | (2024.01) |
| *B01J 37/08* | (2006.01) |
| *C04B 35/63* | (2006.01) |
| *C04B 35/645* | (2006.01) |
| *G01N 33/00* | (2006.01) |
| *H01G 4/12* | (2006.01) |

(52) U.S. Cl.
CPC ............ *B01J 35/40* (2024.01); *B01J 35/73* (2024.01); *B01J 37/08* (2013.01); *C04B 35/6303* (2013.01); *C04B 35/645* (2013.01); *G01N 33/0027* (2013.01); *H01G 4/1254* (2013.01); *B01J 2235/00* (2024.01); *B01J 2235/15* (2024.01); *B01J 2235/30* (2024.01); *C04B 2235/3856* (2013.01); *C04B 2235/3886* (2013.01); *C04B 2235/3895* (2013.01); *C04B 2235/6562* (2013.01); *C04B 2235/6567* (2013.01); *C04B 2235/658* (2013.01); *C04B 2235/768* (2013.01); *C04B 2235/786* (2013.01); *C04B 2235/85* (2013.01); *C04B 2235/9661* (2013.01)

(58) Field of Classification Search
CPC .... C04B 2235/3886; C04B 2235/3895; C04B 2235/6562; C04B 2235/6567; C04B 2235/658; C04B 2235/768; C04B 2235/786; C04B 2235/85; C04B 2235/9661; B01J 35/39; B01J 27/24; B01J 37/08; G01N 33/0027; G01N 2223/638; G01F 15/001; G02B 2006/12138; H01G 4/1254

USPC ......................................................... 502/174
See application file for complete search history.

(56) References Cited

U.S. PATENT DOCUMENTS

| | | | |
|---|---|---|---|
| 2013/0003254 A1* | 1/2013 | Koutsaroff | H01G 7/06 |
| | | | 204/192.1 |
| 2017/0137709 A1 | 5/2017 | Matsumoto | |
| 2018/0286585 A1* | 10/2018 | Umeda | H01G 4/1254 |
| 2019/0019622 A1* | 1/2019 | Yamazaki | C30B 29/10 |
| 2020/0207666 A1 | 7/2020 | Wang et al. | |

FOREIGN PATENT DOCUMENTS

| | | | | |
|---|---|---|---|---|
| JP | 2011236122 A | | 11/2011 | |
| JP | 2017193477 A | | 10/2017 | |
| TW | 201728555 A | * | 8/2017 | ......... C01B 21/0821 |
| WO | 2016021705 A1 | | 2/2016 | |
| WO | WO-2018173491 A1 | * | 9/2018 | ............. B01J 35/00 |
| WO | 2018221504 A1 | | 12/2018 | |

OTHER PUBLICATIONS

International Search Report issued for PCT/JP2020/034471, date of mailing Nov. 17, 2020.

Hosono, Akira et al.; "Molten BaCN2 for the sintering and crystal growth of dielectric oxynitride perovskites Srl-xBaxTaO2N (x=0.04–0.23)"; Dalton transactions, 2017, vol. 2017, No. 46, pp. 16837-16844, fig. 10.

Wang, Bo et al.; "Microstructure and property enhancement of silicon nitride-barium aluminum silicate composites with β-Si3N4 seed addition"; J. Mater. Sci., 2009, vol. 44, pp. 1351-1356, fig.3.

Li, Duan et al.; "Sinterability of the oxynitride LaTiO2N with perovskite-type structure"; Journal of Alloys and Compounds, vol. 586, 2014, pp. 567-573.

Written Opinion of the International Searching Authority issued for PCT/JP2020/034471, date of mailing Nov. 17, 2020.

* cited by examiner

SINTERED BODY, METHOD FOR PRODUCING SAME, AND DIELECTRIC COMPOSITION

CROSS REFERENCE TO RELATED APPLICATIONS

The present application is a continuation of International application No. PCT/JP2020/034471, filed Sep. 11, 2020, which claims priority to Japanese Patent Application No. 2019-166041, filed Sep. 12, 2019, the entire contents of each of which are incorporated herein by reference.

FIELD OF THE INVENTION

The present invention relates to a sintered body composed of polycrystalline grains of a metal oxynitride, a dielectric composition containing the sintered body, and a method for producing the sintered body.

BACKGROUND OF THE INVENTION

In recent years, sintered bodies of a metal oxynitride having a perovskite structure have been known as dielectric materials. For example, Patent Document 1 below discloses a sintered body containing a complex of a plurality of crystal grains containing a metal oxynitride and an amorphous substance. This amorphous substance is present at an interface between crystal grains. The amorphous substance contains carbon and nitrogen. In the method for producing a sintered body described in Patent Document 1, a metal oxynitride and a sintering aid containing cyanamide are sintered in an atmosphere containing nitrogen in a state of being in contact with each other. As the cyanamide, barium cyanamide ($BaCN_2$) is preferably used.

Patent Document 1: WO 2018/173491

SUMMARY OF THE INVENTION

In the sintered body containing a metal oxynitride and the method for producing the sintered body described in Patent Document 1, the nitrogen content is sufficiently large, and therefore a sintered body having excellent dielectric properties and the like can be obtained.

However, the proportion of the oxynitride in the obtained sintered body was not sufficiently increased, and thus physical properties such as dielectric properties cannot be sufficiently utilized. Moreover, relatively large voids are generated in the sintered body, and a dense sintered body cannot be obtained.

An object of the present invention is to provide a sintered body containing a denser metal oxynitride and a method for producing the sintered body.

The sintered body according to the present invention contains polycrystalline grains of a metal oxynitride containing at least two metal elements, wherein barium (Ba) and at least one metal element of a crystal phase of the sintered body are contained in a triple point that is not a void between the polycrystalline grains.

In addition, a method for producing a sintered body according to the present invention includes sintering a mixture of at least a metal oxynitride as a main component and a sintering aid containing cyanamide in an atmosphere containing nitrogen ($N_2$) or a rare gas or in a reduced-pressure atmosphere of 10 Pa or less while applying a mechanical pressure with a retention time at a maximum heating temperature during the sintering set to 1 minute to 10 minutes.

According to the sintered body and the method for producing the sintered body according to the present invention, it is possible to provide a sintered body containing a more dense metal oxynitride.

DETAILED DESCRIPTION OF THE INVENTION

Hereinafter, the present invention will be clarified by describing specific embodiments of the present invention with reference to the drawings.

As a result of intensive studies on the above-mentioned problems, the inventors of the present application have found that the sintered body according to the present invention having higher denseness can be obtained by performing sintering in an atmosphere containing $N_2$ or a rare gas or in a reduced-pressure atmosphere of 10 Pa or less while further applying a mechanical pressure, in a state where at least a metal oxynitride as a main component and a sintering aid containing cyanamide are mixed, with the retention time at the maximum heating temperature during sintering set to a short time of 1 minute to 10 minutes. The sintered body according to the present invention contains polycrystalline grains of a metal oxynitride containing at least two metal elements, wherein Ba and at least one metal element of a main crystal phase of the sintered body are contained in a triple point that is not a void between the polycrystalline grains. Here, the triple point is a grain boundary located at a portion where three crystal grains of the polycrystalline grains are in contact with each another. In the sintered body according to the present invention, the triple point contains Ba and at least one metal element constituting a main crystal phase of the sintered body. As a result, the number of voids in the grain boundary portion is small, and the denseness is enhanced. As described above, such a structure is realized by performing sintering in a short time while applying a mechanical pressure.

Hereinafter, details of the present invention will be described.

In the method for producing a sintered body described in Patent Document 1, the denseness of the sintered body was not sufficient as described above. This is considered to be due to the following reason. In the production method described in Patent Document 1, a heat treatment is performed after a cyanamide-based sintering aid is mixed with an oxynitride. Therefore, it has been considered that thermal decomposition of the oxynitride phase and occurrence of nitrogen deficiency can be suppressed. This is because $BaCN_2$ melts at a temperature around 900° C., which is lower than a temperature at which nitrogen (N) contained in the oxynitride is partially released from the oxynitride, and the resulting liquid phase can dissolve the oxynitride phase. The dissolved oxynitride phase is reprecipitated to cause grain growth.

However, in order to cause dissolution and reprecipitation of the oxynitride phase, it is required to entirely cover the surface of the oxynitride grains with the melt of $BaCN_2$. In order to realize such a state, it is necessary to mix a large amount of $BaCN_2$.

Figure 3:
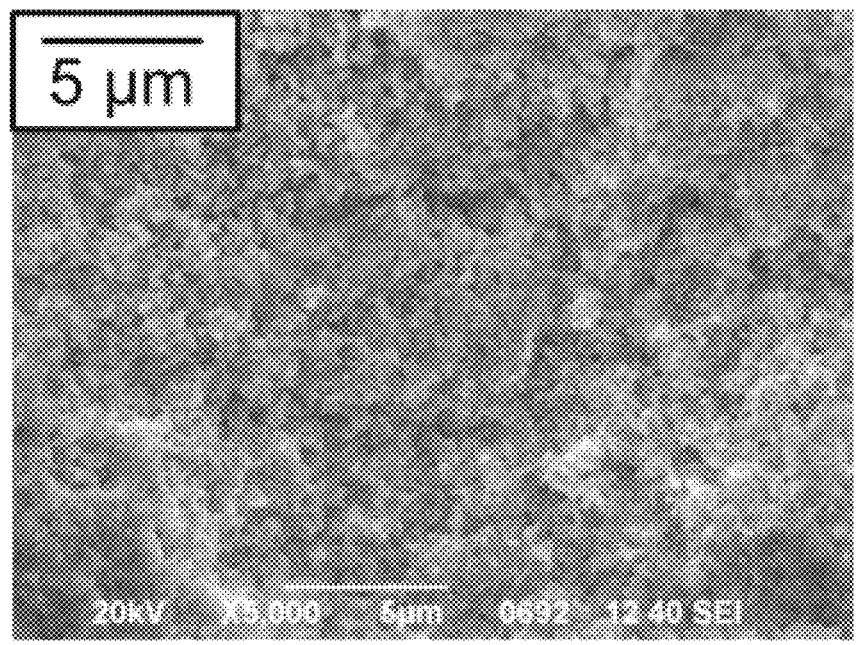
FIG. 3 is an SEM photograph (magnification: 5,000 times) of the inside of the sintered body obtained in Example 1.

When $BaCN_2$ is melted by heating, $BaCN_2$ as a liquid phase penetrates into gaps in the molded body due to a capillary phenomenon. Conversely, the portions where the grains of $BaCN_2$ were originally present become voids. As a result, as shown in FIG. 3 of Patent Document 1, huge voids having a diameter of several tens of μm to several hundred μm may be generated in the resulting sintered body.

In addition, Patent Document 1 describes that the degree of densification of the sintered body obtained by the production method described in Patent Document 1 is about 80%, but the dense portion is in a state where oxynitride grains and a large amount of $BaCN_2$ solidified phase are mixed. The net degree of densification of the oxynitride grains is several tens of percent lower than 80% accordingly. Therefore, physical properties such as electrical characteristics derived from the oxynitride cannot be sufficiently utilized.

On the other hand, in the sintered body according to the present invention, since the sintered body is sintered in a state where a mechanical pressure is applied as described above, the denseness of the oxynitride is dramatically improved.

The sintered body according to the present invention contains polycrystalline grains of a metal oxynitride having at least two metal elements, wherein Ba and at least one metal element of a crystal phase of the sintered body are contained in a triple point that is not a void between three crystal grains of the polycrystalline grains.

As the at least two metal elements contained in the metal oxynitride, an alkaline earth metal or La is suitably used. By using at least one of an alkaline earth metal or lanthanum (La), a sintered body having a high nitrogen content can be easily obtained. As the alkaline earth metal, Ba, strontium (Sr), and calcium (Ca) are preferable, and it is preferable to use at least one of four types of metal elements including La. That is, it is preferable to use at least one of Ba, Sr, Ca, or La. More preferably, at least one of Ba or Sr is suitably used. When Ba or Sr is used, a sintered body having a higher nitrogen content can be reliably obtained. A plurality of crystal grains containing a metal oxynitride are crystalline. The sintered body according to the present invention contains a plurality of the crystalline grains.

In the sintered body, the average value of the equivalent circle diameters of the crystal grains is preferably 0.10 μm or more. In that case, it can be considered that the crystal grains are formed by bonding and growing oxynitride grains as a raw material of the sintered body. When very fine crystal grains of 0.10 μm or less are used, the surface area of crystal grains to be covered with molten $BaCN_2$ at the time of sintering becomes too large, and thus it is necessary to mix a large amount of $BaCN_2$ as in Patent Document 1. In addition, the average value of the equivalent circle diameters of the crystal grains is desirably 1.0 μm or less. When large crystal grains of 1.0 μm or more are used, relatively coarse voids of 1.0 μm or more are likely to remain even when sintering is performed while applying a mechanical pressure. This causes disadvantages that electrical characteristics such as dielectric properties of an oxynitride cannot be utilized, and mechanical strength is likely to decrease. The average value of the equivalent circle diameters can be obtained by using image analysis software "A-Zou Kun" (manufactured by Asahi Kasei Engineering Corporation) on an image acquired at a magnification at which the shape and size of the grain can be determined (for example, an image observed with a transmission electron microscope at a magnification of 100,000 to 200,000 times).

A method of analyzing the average value of equivalent circle diameters using the above "A-Zou Kun" will be described.

First, an image at a magnification at which the shape of the grains and voids in the sintered body can be distinguished was acquired with a microscope. In the present invention, an image at a magnification of 100,000 to 160,000 times was acquired with a transmission electron microscope. Subsequently, the brightness and contrast were adjusted so that the shape of the grains, the boundaries between the grains, and the boundaries between the grains and the void portion were conspicuous. A binarization treatment was performed, and only the grain portion was extracted.

Note that if the "color extraction" of "A-Zou Kun" described above was not complete, the "color extraction" was manually supplemented.

When a portion other than the grains, that is, an amorphous portion or a void portion in the sintered body was extracted, this was deleted.

The number, area, and equivalent circle diameter of the grains were measured by "Particle Analysis" of image processing software.

Note that the number, area, and equivalent circle diameter of the void portion regarded as a grain can be measured by extracting only the void portion by the binarization treatment. In addition, a portion having an intermediate color tone in the image, which is neither a grain portion having a dark color tone nor a void portion having a bright color tone, can be extracted by manually compensating the contour thereof, and similarly, the number, area, and equivalent circle diameter thereof can be measured.

The crystal grain includes a perovskite structure.

The sintered body according to the present invention has a high relative permittivity. Therefore, the sintered body of the present invention is suitably used for a dielectric composition.

As described above, the reason why the sintered body according to the present invention is excellent in characteristics as a dielectric is the following reasons. Oxygen (O) and N are sufficiently contained in the sintered body, and lattice defects of O or N are adequately small. As a result, the insulating properties are improved, and the degree of densification of the sintered body is high, and the proportion of the oxynitride crystal grains in the volume of the sintered body is high. As described in Examples described later, the sintered body obtained in the present invention exhibits orange to red almost similarly to general oxynitride powders. Therefore, it can be seen that desorption of N hardly occurs, and a sintered body having a large N content is obtained.

The color tone of orange to red indicates that the band gap is in the visible light region. Therefore, the sintered body according to the present invention can be suitably used for a photocatalytic composition, which responds to visible light, a photoelectric conversion element, and the like. In addition, the element exposed on the outermost surface of the sintered body may contain N unlike the conventional oxide sintered body. This provides a possibility that the reaction to the contacted gas is different from that of the oxide. Therefore, a gas sensor capable of measuring a gas that cannot be measured by a conventional oxide sensor can also be provided.

Figure 4:
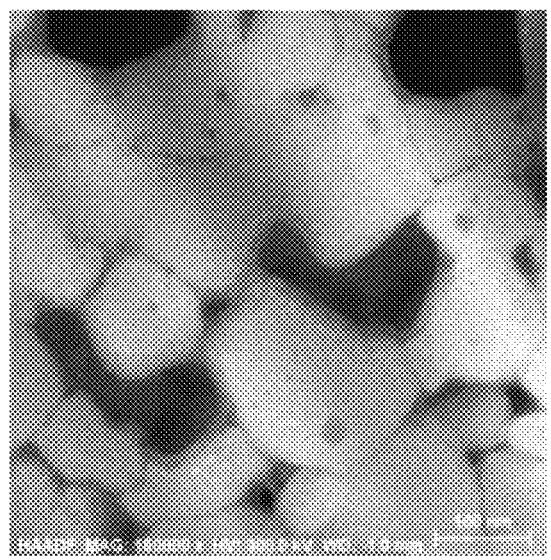
FIG. 4 is a photograph showing an image of the sintered body obtained in Example 1, observed with a high-angle annular dark-field scanning transmission electron microscope (HAADF-STEM) (magnification: 160,000 times).
Figure 6:
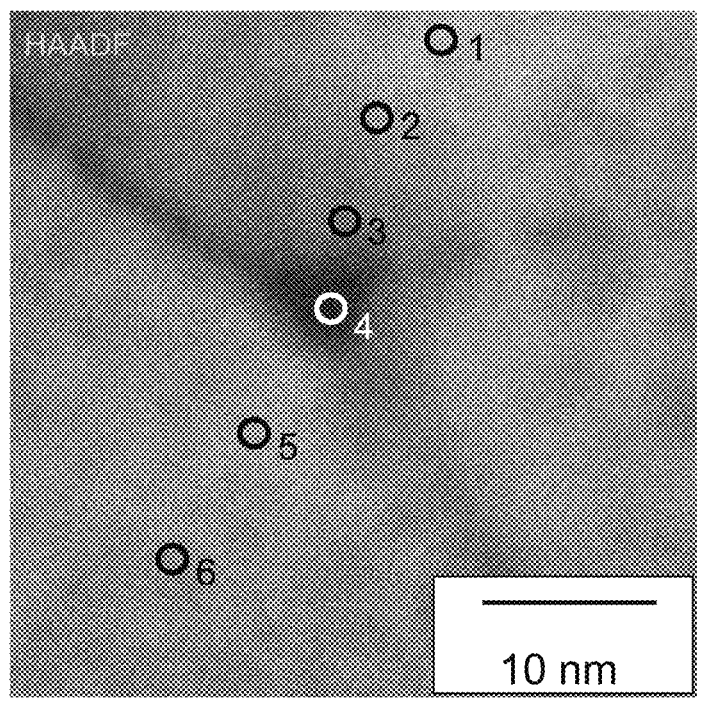
FIG. 6 is an image of the sintered body obtained in Example 1 observed with a HAADF-STEM, and is a photograph showing positions where the concentration ratio between Ba and tantalum (Ta) is measured.
Figure 7:
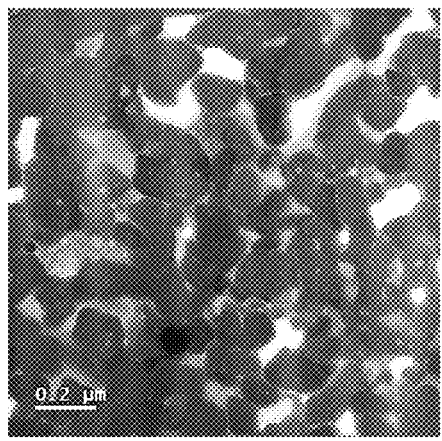
FIG. 7 is a photograph showing a TEM bright field image of the sintered body obtained in Example 1.
Figure 8:
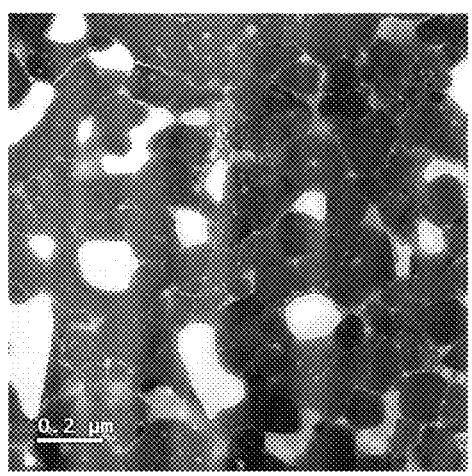
FIG. 8 is a photograph showing a TEM bright field image of the sintered body obtained in Example 1.
Figure 9:
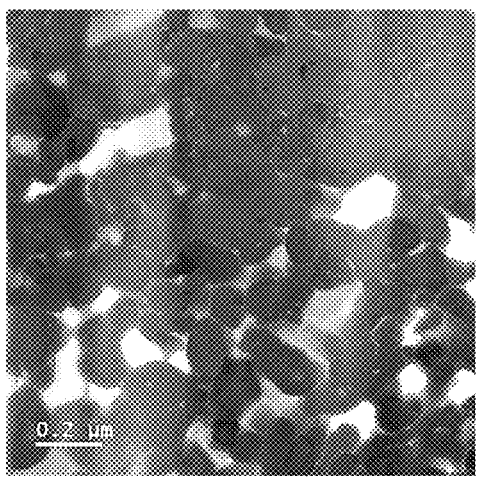
FIG. 9 is a photograph showing a TEM bright field image of the sintered body obtained in Example 1.
Figure 10:
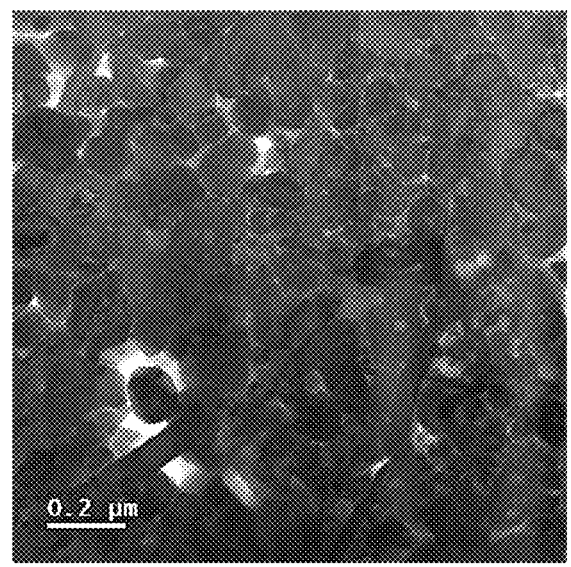
FIG. 10 is a photograph showing a TEM bright field image of the sintered body obtained in Example 1.
Figure 11:
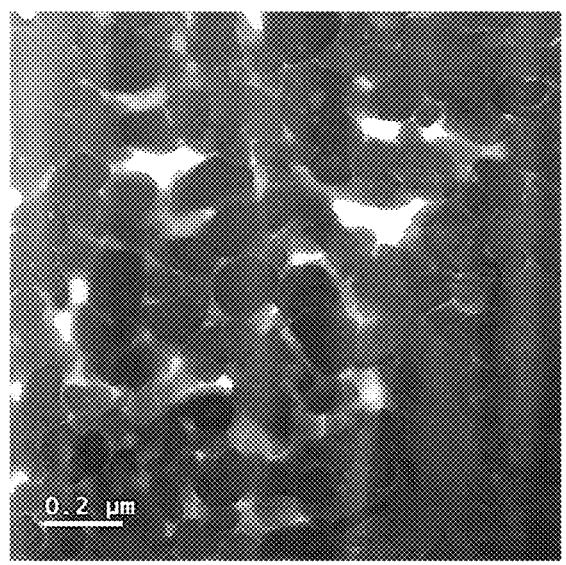
FIG. 11 is a photograph showing a TEM bright field image of the sintered body obtained in Example 1.

In the polycrystalline grains of the metal oxynitride having at least two types of metal elements, a portion where three crystal grains are in contact with each another is a triple point. An example of the triple point will be described with reference to photographs of FIG. 4 and FIG. 6 showing the results of Examples described later. FIG. 4 is a HAADF-STEM photograph (magnification: 160,000 times) of the sintered body obtained in Example 1. FIG. 6 is a photograph showing the main part in an enlarged manner. As shown in FIG. 4, a large number of crystal grains are in contact with each other. As shown in an enlarged view in FIG. 6, a triple point exists at an interface between the three crystal grains. In FIG. 6, reference numerals 1 to 6 denote a measurement position described later. A portion indicated by a measurement position 4 in FIG. 6 is a triple point. In the sintered body of the present invention, the triple point contains Ba and at least one metal element constituting the crystal phase. Preferably, the concentration ratio between Ba and the metal element in the triple point is higher than the concentration ratio between Ba and the metal element in the crystal grain.

That is, the measurement positions 1, 2, 3, 5, and 6 shown in FIG. 6 are measurement positions in the crystal grain, whereas the measurement position 4 indicated by the numeral 4 is a measurement position in the triple point. The Ba concentration, the Ta concentration, which is another metal element constituting the crystal phase of the oxynitride, and the concentration ratio Ba/Ta of these elements at the measurement positions 1 to 6 are shown in Table 1 below.

As shown in Table 1, the concentration ratio between Ba and Ta in the triple point is higher than the concentration ratio between Ba and Ta in the crystal grain.

In addition, as shown in FIG. 4, in the sintered body according to the present invention, a portion where the crystal grains are in surface contact with each other preferably exists. Here, the surface contact refers to a portion where adjacent crystal grains are not in point contact but are in contact with each other with a certain length in a field of view observed with an electron micrograph. Preferably, the grain boundary portion where the crystal grains are in surface contact with each other does not have an amorphous phase. According to the method for producing a sintered body according to the present invention, as will be described later, the proportion of the sintering aid containing cyanamide is small, and sintering is performed by applying a mechanical pressure, so that the sintering aid preferably does not constitute an amorphous phase. Therefore, the density of the oxynitride in the sintered body is more effectively enhanced, and the substantial denseness is effectively enhanced.

In addition, the equivalent circle diameter of the voids between the crystal grains is preferably 1.0 μm or less. Here, the equivalent circle diameter refers to the diameter of a circle when a freely selected cross section of the sintered body is observed with an electron microscope and a circle equal to the area of a void between crystal grains is assumed. That is, the diameter of a circle having the same area as the void is defined as the equivalent circle diameter. When the equivalent circle diameter is 1.0 μm or less, the size of the void is very small. Therefore, the denseness is more effectively enhanced.

In addition, preferably, the equivalent circle diameter of a region excluding the voids in a portion other than the crystal grains is also 1.0 μm or less. This region is considered to be formed by once melting a sintering aid containing cyanamide and then solidifying the sintering aid again. In this case, the denseness of the sintered body can be further enhanced.

In the sintered body according to the present invention, the degree of densification of the oxynitride grains in the sintered body is preferably 55% or more, more preferably 80% or more. Here, the degree of densification of the oxynitride grains refers to the content of the oxynitride in the sintered body. This degree of densification can be determined by the following method.

Method for calculating the degree of densification: The volume and mass of the obtained sintered body are measured, and the density is measured from the measurement results. This density is compared with the theoretical density described, for example, in the ICDD data. That is, the degree of densification is represented by (determined density/theoretical density)×100(%).

In the sintered body according to the present invention, preferably, 90% or more of the crystal phase of the oxynitride generally has a perovskite structure represented by $AB(O,N)_3$. That is, the sintered body is preferably a sintered body mainly composed of a perovskite phase. Here, A and B are metal elements constituting the oxynitride. Here, when the composition of the oxynitride having a perovskite structure is represented by $A_aB_bO_cN_n$, a≥b and n≤o/2 are preferably satisfied. The sintered body according to the present invention may contain a composite metal oxynitride phase having a crystal structure different from the perovskite structure, generally represented by $A_{m+1}BO_{m+2}N$ where m is an integer of 1 or more, for example, $A_2BO_{4-x}N_x$ where x is greater than 0 in a range of 0 wt % to 10 wt %.

Further, in the sintered body according to the present invention, desirably, the sintered body does not contain a crystalline metal oxide phase, a metal carbide phase, or a metal nitride phase therein. That is, it is desirable not to have a crystal phase that is a heterogeneous phase other than the oxynitride phase. In this case, it is possible to obtain a sintered body that further exhibits the characteristics of the metal oxynitride.

The constituent element of the composite metal oxynitride is not particularly limited, but Ta, niobium (Nb), or the like can be used. When the sintered body is used as a dielectric, Ta is desirably used.

In the sintered body according to the present invention, preferably, the difference between the maximum value and the minimum value in a wavelength range of 400 nm to 800 nm is desirably 10% or more in the diffuse reflection spectrum in the sintered body. In this case, the band gap is in the visible region. The upper limit of the difference between the maximum value and the minimum value of the reflection spectrum is not particularly limited, but is 50% or less.

In the diffuse reflection spectrum of the powder obtained by pulverizing the sintered body according to the present invention, the difference between the maximum value and the minimum value in a wavelength range of 400 nm to 800 nm is preferably 10% or more. In this case, the powder exhibits a color tone such as red, orange, or yellow. Therefore, it is found that the denseness of the metal oxynitride is reliably enhanced in the sintered body. The upper limit of the difference between the maximum value and the minimum value of the reflection spectrum is not particularly limited, but is 50% or less.

The direct-current volume resistance in the sintered body according to the present invention is preferably $10^6$ Ωcm or more.

The fact that the sintered body according to the present invention is excellent in characteristics as a dielectric is considered to be because O and N are sufficiently contained in the sintered body, and the lattice defect of O or N is adequately small, so that the insulating properties are improved. As explained in relation to the Examples described later, the sintered body obtained in the present invention exhibits orange to red almost similarly to general oxynitride powders. This indicates that desorption of N hardly occurs, and a sintered body having a large N content is obtained.

In the method for producing a sintered body according to the present invention, sintering is performed in an atmosphere containing $N_2$ or a rare gas or in a reduced-pressure atmosphere of 10 Pa or less while further applying a mechanical pressure, in a state where at least a metal oxynitride as a main component and a sintering aid containing cyanamide are mixed. Thereby, a sintered body with enhanced denseness can be obtained.

As the sintering aid containing cyanamide, a sintering aid having a melting point lower than a temperature at which a part of N is desorbed from the metal oxynitride is preferable. Such a sintering aid further prevents desorption of N during sintering. The cyanamide is not particularly limited, but $BaCN_2$, strontium cyanamide ($SrCN_2$), calcium cyanamide ($CaCN_2$), or the like can be preferably used, and $BaCN_2$ is more preferably used.

The $BaCN_2$ is used as a sintering aid, and the crystal structure of $BaCN_2$ is not observed in the obtained sintered body.

Preferably, the sintering aid is in the form of a powder or particles. In that case, the metal oxynitride can be easily mixed, and the sintering can be performed in a mixed state. Therefore, a sintered body having a high N content can be obtained more reliably.

In the production method of the present invention, the metal oxynitride is preferably a material that dissolves in a liquid phase in which cyanamide has been melted. This makes it possible to more reliably provide a sintered body having a high nitrogen content.

In the production method of the present invention, one selected from the group consisting of $BaTaO_2N$, $SrTaO_2N$, $CaTaO_2N$, and $LaTaON_2$ is preferably used as the metal oxynitride.

An embodiment of a production method when $BaCN_2$ is used as a sintering aid and $SrTaO_2N$ is used as a metal oxynitride will be described.

The melting point of $BaCN_2$ is around 900° C. Meanwhile, the temperature at which weight change involving partial desorption of N from $SrTaO_2N$ starts is around 1,000° C. Therefore, $BaCN_2$ present around $SrTaO_2N$ changes to a liquid phase at a temperature around 900° C. at which desorption of N from $SrTaO_2N$ hardly occurs. The $SrTaO_2N$ grains are repeatedly dissolved in $BaCN_2$ in the liquid phase and reprecipitated. That is, $SrTaO_2N$ is sintered by liquid phase sintering. The $SrTaO_2N$ grains are repeatedly dissolved and reprecipitated to be bonded to each other, and grain growth proceeds. As a result, a sintered body of $Sr_{1-x}Ba_xTaO_2N$ can be obtained.

Conventionally, sintering of $SrTaO_2N$ requires a high temperature of 1,400° C. or higher. On the other hand, in the production method of the present invention, sintering can be performed at a low temperature of about 880° C. to 950° C. Therefore, partial desorption of N hardly occurs at the time of sintering. As a result, it is possible to obtain a sintered body in which the N content is maintained.

As described above, the temperature at which N is desorbed from $SrTaO_2N$ is around 1,000° C. Therefore, in the production method of the present invention, sintering is preferably performed at a temperature lower than 1,000° C. More preferably, in the method for producing a sintered body according to the present invention, sintering is preferably performed at a temperature of 880° C. to 950° C. in a state where the metal oxynitride and the sintering aid containing cyanamide are in contact with each other. Within this temperature range, the sintering aid containing cyanamide melts to proceed liquid phase sintering, and desorption of N further hardly occurs.

In the method for producing a sintered body according to the present invention, an aspect in which the metal oxynitride and the sintering aid containing cyanamide are brought into contact with each other in the sintering is not particularly limited. The metal oxynitride and the sintering aid containing cyanamide may be mixed. Alternatively, the sintering aid containing cyanamide may be disposed on the metal oxynitride or under the metal oxynitride.

In the method for producing a sintered body according to the present invention, sintering is performed in an atmosphere containing nitrogen or a rare gas such as argon gas or in a reduced-pressure atmosphere of 10 Pa or less while further applying a mechanical pressure. The method for applying a mechanical pressure is not particularly limited, and examples thereof include an appropriate method such as pressing. For example, the metal oxynitride and the sintering aid containing cyanamide may be disposed in a cylindrical die, and sintering may be performed while pressurizing from above and below using a punch or the like. In this case, preferably, a filling powder composed of boron nitride (BN), a metal oxynitride to be sintered, or the like may be disposed between the punch and a raw material. The cyanamide in the raw material melts and penetrates the raw material powder layer by a capillary phenomenon, and further seeps out of the powder layer. When the oozing cyanamide diffuses into the punch, there is a possibility that the punch may be deteriorated, or elements constituting the punch may be dissolved in the molten cyanamide and diffuse to the raw material powder layer side. Depending on the material constituting the punch, there is a risk of diffusion to the raw material powder side regardless of the action of the molten cyanamide. In order to prevent diffusion of these molten cyanamide into the punch and diffusion of the punch material into the raw material powder, it is desirable to use the above filling powder.

When an atmosphere containing oxygen such as air and having a pressure of 10 Pa or more is used as an atmosphere during production, oxidation of the metal oxynitride or the sintering aid containing cyanamide occurs, which is not preferable. The upper limit of the oxygen partial pressure in the atmosphere is not clear, but a nitrogen or rare gas atmosphere supplied from a general gas cylinder or gas plant are suitable, and there is no problem even if oxygen corresponding to impurities is contained in the atmosphere.

In the method for producing a sintered body according to the present invention, since a mechanical pressure is applied, the amount of the sintering aid to be used may be small. That is, the sintering aid is preferably used in a proportion of 10 wt % or less with respect to 100 wt % of the metal oxynitride. The lower limit thereof is preferably 3 wt % or more. Within this preferred range, a dense sintered body can be obtained, and the amorphous phase caused by the sintering aid can be reduced. Therefore, the proportion of the crystal phase composed of the metal oxynitride can be more effectively increased.

In the method for producing a sintered body according to the present invention, the retention time at the maximum heating temperature during sintering is preferably 1 minute to 10 minutes. A dense sintered body can be obtained in such a relatively short time. Heating with this preferable retention time makes it possible to reliably provide a dense sintered body in which partial desorption of N in the oxynitride hardly occurs.

The temperature raising rate during sintering is preferably 50° C./min to 100° C./min. With this preferable temperature raising rate, temperature control is easy, and partial desorption of N in the oxynitride hardly occurs.

The dielectric composition according to the present invention is a dielectric composition containing the sintered body of the present invention, and has a relative permittivity of 200 or more when an electric field of 100 Hz to 1 MHz is applied in a temperature range of −50° C. to 150° C. Therefore, a sintered body having more excellent dielectric properties can be provided. Accordingly, the dielectric composition according to the present invention can be suitably used for, for example, a capacitor. In addition, the dielectric composition containing the sintered body according to the present invention preferably has a rate of change in relative permittivity within ±10% when an electric field of 100 kHz is applied due to a temperature change in a temperature range of 30° C. to 150° C. In this case, a capacitor or the like having a small change in relative permittivity due to a temperature change can be provided.

The structure of the capacitor according to the present invention is not particularly limited as long as the capacitor includes the dielectric composition according to the present invention and a pair of electrodes facing to each other with the dielectric composition interposed therebetween. In this case, one electrode of the pair of electrodes may be provided on a certain surface of the dielectric composition, and the other electrode may be provided on the other surface of the dielectric composition. Alternatively, a pair of electrodes may be provided on the same surface of the dielectric composition with a gap therebetween.

Each of the photocatalytic composition, the photoelectric conversion element, and the gas sensor according to the present invention includes the sintered body according to the present invention.

In the photocatalyst, the band gap is preferably in a visible light region, that is, in a region of 1.65 eV to 3.26 eV. This is because the energy width of the available sunlight increases, so that the photocatalytic properties can be enhanced. The sintered body obtained by the present invention exhibits a color tone of orange to red. Therefore, it is presumed that the band gap is in the visible light region. Therefore, the sintered body according to the present invention can be suitably used for a photocatalytic composition that responds to visible light.

Also in a photoelectric conversion element such as a solar cell, the photoelectric conversion material desirably has a band gap in the visible light region, and preferably contains less impurities. Therefore, the sintered body of the present invention can be suitably used for the photoelectric conversion element. In addition, the element exposed on the outermost surface of the sintered body may contain N unlike the conventional oxide sintered body. This provides a possibility that the reaction to the contacted gas is different from that of the oxide. Therefore, a gas sensor capable of measuring a gas that cannot be measured by a conventional oxide sensor can also be provided.

Hereinafter, the present invention will be described in more detail by giving specific examples and comparative examples.

Example 1

1. Synthesis of $BaTaO_2N$ Powder

A barium carbonate ($BaCO_3$) powder and a tantalum oxide ($Ta_2O_5$) powder in an amount of ½ mol with respect to $BaCO_3$ were mixed in an acetone dispersion medium. After the mixture was dried in air, the obtained mixed powder was placed on a boat made of aluminum oxide ($Al_2O_3$) and the boat was placed in a tubular furnace having a quartz glass furnace core tube. The mixed powder was heated at 930° C. for 30 hours while ammonia ($NH_3$) gas was allowed to flow in the furnace core tube at a flow rate of 100 ml/min, thereby synthesizing the $BaTaO_2N$ powder. At this time, the temperature raising rate and the temperature lowering rate in the temperature controller of the tubular furnace were set to 5° C./min. The obtained powder was subjected to crystal analysis using an XRD apparatus. The results showed that the crystal phase of the obtained powder matched the data of the inorganic crystal structure of $BaTaO_2N$ (ICDD78-1455).

2. Synthesis of $BaCN_2$ Powder

A barium carbonate ($BaCO_3$) powder was placed on an $Al_2O_3$ boat, and the boat was placed in the same tubular furnace used for the synthesis of the $BaTaO_2N$ powder. The powder was heated at a temperature of 900° C. for 10 hours while $NH_3$ gas was allowed to flow in the furnace core tube at a flow rate of 50 ml/min. The temperature raising rate and the temperature lowering rate were set to 5° C./min.

The obtained powder was subjected to crystal analysis using an XRD apparatus. As a result, the obtained XRD pattern was identical to the XRD pattern obtained using the XRD apparatus in Example 1 of Patent Document 1 (WO 2018/173491). The result indicates that the $BaCN_2$ powder was obtained.

3. Preparation of $BaTaO_2N$—$BaCN_2$ Mixed Powder

To 100 parts by weight of the $BaTaO_2N$ powder thus obtained, 10 parts by weight of the $BaCN_2$ powder was added. The mixed powder was placed in a yttria stabilized zirconia (YSZ) container together with hexane ($C_6H_{14}$) as a dispersion medium and YSZ balls, and the container was sealed. Then, the powder was mixed using a planetary ball mill. The resulting mixed powder was dried in a glove box in a $N_2$ gas atmosphere. The dried mixed powder was subjected to combustion analysis, and the O content and the N content were determined. As a result, the O content was 7.7 wt %, and the N content was 3.8 wt %.

The mixed powder prepared as described above was introduced into a graphite die (hereinafter, referred to as graphite mold). The inner diameter of the die was 10 mm. Graphite punches are inserted into the graphite mold from above and below. Thereby, a mechanical pressure can be applied from above and below. The powder in the die had a three-layer structure of 150 mg of the $BaTaO_2N$ powder, 500 mg of the mixed powder, and 150 mg of the $BaTaO_2N$ powder. The upper and lower $BaTaO_2N$ powders are filling powders, that is, sacrificial layers. In order to prevent diffusion of impurities due to contact of the graphite punches with the mixed powder, the $BaTaO_2N$ powders were disposed.

The graphite mold was set in a pressure sintering apparatus, the pressure was reduced to about 6 Pa, and a pressure of 70 MPa was applied to the mixed powder. That is, the above described pressure was applied to the mixed powder by the graphite punches. At this time, in order to apply a surface pressure of 70 MPa to a circular portion having a diameter of 10 mm, the output of the pressure apparatus was set to about 5.5 kN. The mixed powder was heated while this pressure was applied. The temperature raising rate was set to 50° C./min, and the temperature was raised to a temperature of 900° C. After retaining the temperature at 900° C. for 3 minutes, the heating was stopped and the mixed powder was naturally cooled in the pressure sintering apparatus. The pressure was reduced to 0.6 kN (surface pressure: about 10 MPa) about 3 minutes after the start of the natural cooling.

After confirming that the temperature of the graphite mold decreased to around room temperature, the graphite mold was taken out from the pressure sintering apparatus, and then the sintered body was released from the graphite mold. Sacrificial layers derived from the $BaTaO_2N$ powder adhered above and below the sintered body. The upper and lower sacrificial layers were removed by grinding using abrasive paper. The obtained sintered body was a hard sintered body having a reddish brown color tone and a disk shape. The diameter, thickness, and mass of the obtained disk-shaped sintered body were measured. The density was measured from the measurement results. This density was compared with the theoretical density of $BaTaO_2N$ described in the ICDD data. As a result, the obtained density was 83.0% of the theoretical density, that is, the degree of densification, which is the relative density, was 83.0 wt %.

The sintered body was subjected to combustion analysis, and the result showed that the O content was 7.9 wt %, and the N content was 3.7 wt %.

Figure 1:
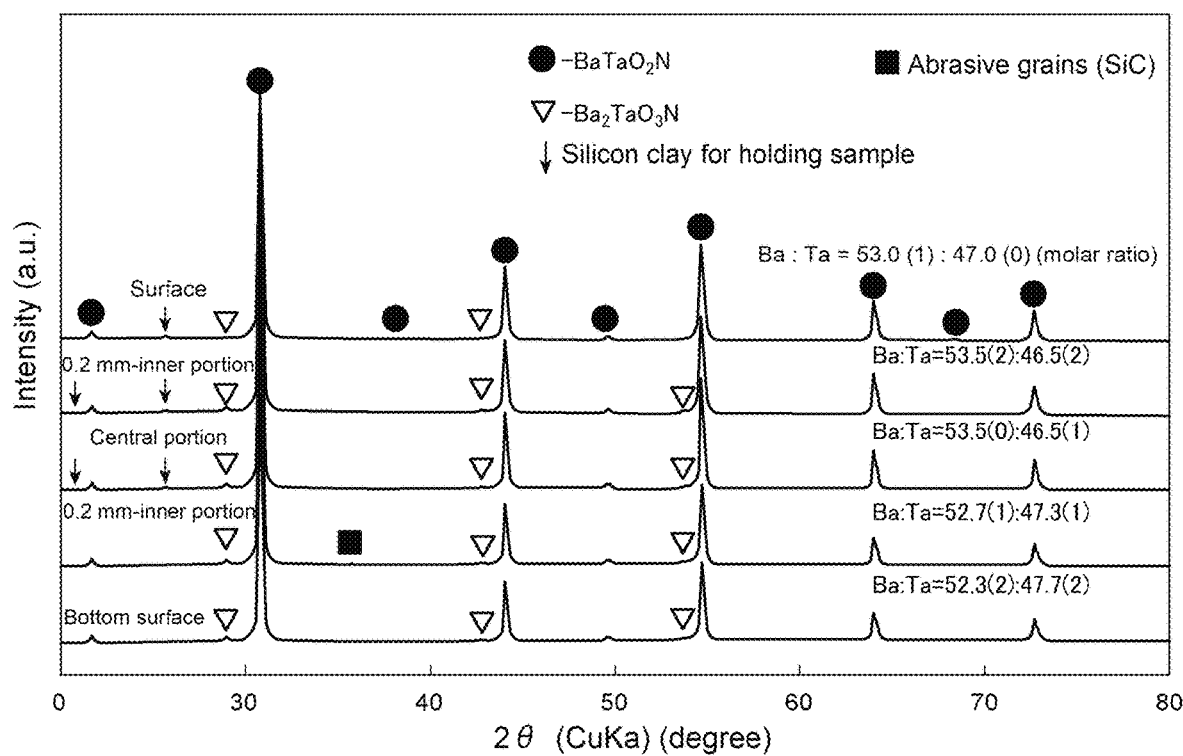
FIG. 1 is a graph showing an X-ray diffraction (XRD) pattern at each depth position from a surface to a bottom surface of a sintered body obtained in Example 1.

The surface of the sintered body was ground with abrasive paper having silicon carbide (SiC) abrasive grains, and XRD measurement and X-ray fluorescence (XRF) measurement were performed. XRD measurement was performed at each depth direction position from the surface to the bottom surface of the disk-shaped sintered body. FIG. 1 is a graph showing an XRD pattern at each depth position from a surface to a bottom surface of the sintered body obtained in Example 1.

As is clear from FIG. 1, only the $BaTaO_2N$ phase and the $Ba_2TaO_3N$ phase were detected from the surface of the sintered body to the central position in the depth direction. In addition, diffraction peaks of oxides, carbides, and carbonates were not observed. The diffraction derived from SiC of abrasive grains of the abrasive paper and silicon clay for sample fixation in the XRD analysis was observed.

The abundance of each phase was estimated from each peak intensity ratio between the $BaTaO_2N$ phase and the $Ba_2TaO_3N$ phase appearing in the XRD pattern. As a result, the content of $BaTaO_2N$ was about 94.16 wt %, and the content of $Ba_2TaO_3N$ was 5.84 wt %.

In addition, the molar ratio of Ba to Ta was calculated by XRF measurement and found to be about 53:47. That is, the result confirmed that the sintered body was basically a Ba-rich sintered body.

Figure 2:
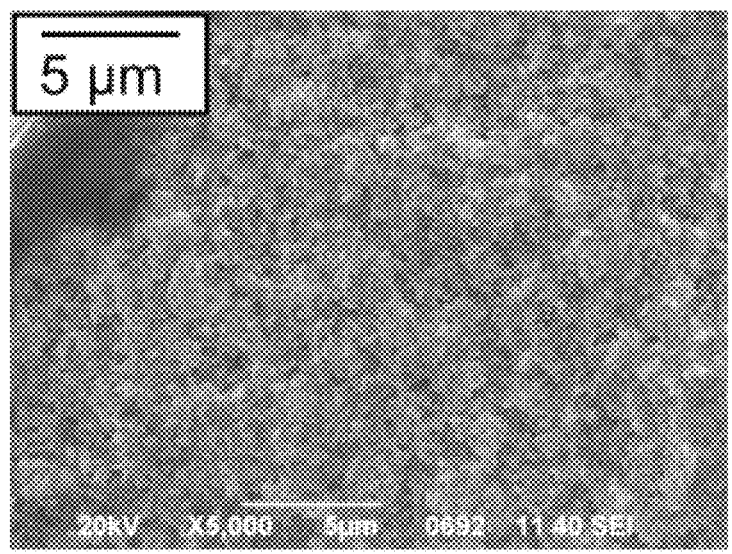
FIG. 2 is a scanning electron microscope (SEM) photograph (magnification: 5,000 times) of an outer peripheral side portion of the sintered body obtained in Example 1.

The outer peripheral side portion of the sintered body and the inside thereof, exposed due to breaking were observed by the SEM. FIG. 2 is an SEM photograph of the outer peripheral side portion of the sintered body, and FIG. 3 is an SEM photograph of the inside of the sintered body, both photographs being captured at a magnification of 5,000 times. As is clear from FIG. 2 and FIG. 3, no structural difference was observed between the outer peripheral side portion and the inside. In addition, there was no void to the extent that the size, that is, the diameter can be measured.

The inside of the obtained sintered body was observed with a TEM. FIG. 4 is a HAADF-STEM photograph at a magnification of 160,000 times, and FIG. 5 is a photograph showing a bright field image of a TEM photograph.

Figure 5:
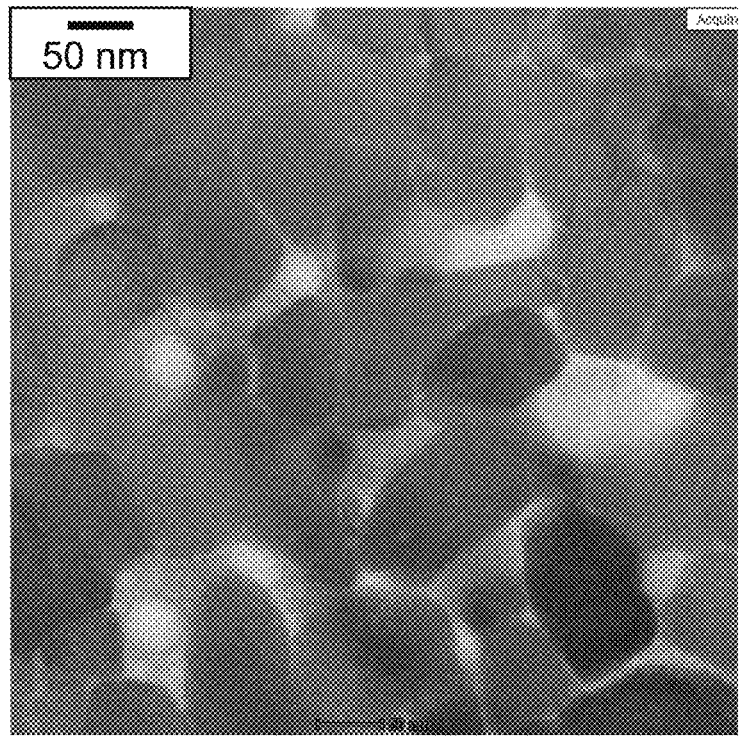
FIG. 5 is a photograph showing a bright field image of the sintered body obtained in Example 1, observed a with transmission electron microscope (TEM).

As is apparent from FIG. 4 and FIG. 5, it is found that crystal grains of the oxynitride had a grain size of about 100 nm to 200 nm. In addition, the crystal grains are deformed, brought into close contact with each other, and bonded in a surface contact state. Here, the surface contact state is not a point contact but a linear portion where adjacent crystal grains are in contact with each other in the cross section of the sintered body. That is, the surface contact state means that contact is made on a surface having a certain area.

The length of the linear portion is not particularly limited, but as shown in FIG. 4 and FIG. 5, the surface contact means that when the cross section of the sintered body is observed at a magnification at which 10 to 100 grains can be distinguished, a portion where the contours of the grains in contact with each other overlap is observed as a line rather than a point. As shown in FIG. 2 and FIG. 3, when a large number of more than 100 grains are included in the field of view and the state of bonding between individual grains cannot be distinguished, the presence of surface contact should not be verified. Conversely, in an observation image at a significantly high magnification in which only a contact portion between two grains is enlarged, even if the contact portion is observed as a line, it cannot be said that the grains are in surface contact unless the grains are in contact with each other at a position not included in the field of view.

In addition, FIG. 4 shows that the size of the voids between the crystal grains is also about 100 nm to 200 nm. Further, a thin skin-like pattern having a thickness of about 10 nm is observed on the surfaces of the crystal grains in contact with the voids. As shown in FIG. 5, bright color tone portions were present, and a void having a shape close to a circular shape was observed at each portion.

FIG. 6 is a HAADF-STEM photograph of the sintered body obtained in Example 1, and is a photograph showing positions where the concentration ratio between Ba and Ta was measured.

Reference numerals 1 to 6 in FIG. 6 indicate a measurement position. The measurement position 4 is a void portion where three crystal grains are adjacent, that is, the triple point. Energy dispersive X-ray (EDX) analysis was performed at a portion forming the triple point, that is, the measurement position 4 and at the measurement positions 1 to 3, 5, and 6 of the peripheral edge thereof. The Ba concentration, the Ta concentration, and the Ba/Ta ratio at each measurement position are shown in Table 1 below.

TABLE 1

| Measurement position | Ba at % | Ta at % | Ba/Ta |
|---|---|---|---|
| 1 | 1.1 | 1.3 | 0.87 |
| 2 | 1.0 | 0.9 | 1.03 |
| 3 | 1.0 | 0.9 | 1.16 |
| 4 | 0.9 | 0.5 | 1.90 |
| 5 | 0.6 | 0.6 | 1.07 |
| 6 | 0.9 | 1.1 | 0.78 |

As is apparent from Table 1, the Ba/Ta ratio was the highest in the grain boundary portion, that is, at the triple point. In addition, with respect to the Ba content at the measurement position 4, there were a case where the Ba content at the measurement positions 1, 2, 3, 5, and 6 inside the crystal grains was larger than the Ba content at the measurement position 4 and a case where the Ba content at the above measurement positions was smaller than the Ba content at the measurement position 4. On the other hand, with respect to the Ta content, the Ta content at the measurement position 4 was the smallest.

TEM bright field images were taken at a plurality of portions in the sintered body at a magnification of 150,000 times. FIG. 7 to FIG. 11 are photographs showing TEM bright field images of the sintered body.

The grain size distribution, the void distribution, and the distribution of the region excluding voids in the portion other than crystal grains were measured using image analysis software "A-Zou Kun" (manufactured by Asahi Kasei Engineering Corporation) in the same manner as the analysis method described in Patent Document 1. Here, the region excluding voids in the portion other than crystal grains is a portion considered to be an amorphous phase generated when $BaCN_2$ melted once during sintering and then solidified again. The measurement method is the same as the method described in Patent Document 1, and the analysis method and the measurement method are incorporated herein.

As a result, 292 grains were measured in the grain size distribution. The equivalent circle diameter of the crystal grain was 120.2 nm. Further, in the measurement of the void distribution, 83 voids were measured, and the circle equivalent average diameter of the voids was 81.0 nm. The number of portions considered to be the amorphous phase was 99, and the circle equivalent average diameter of the portions was 69.5 nm.

Figure 12:
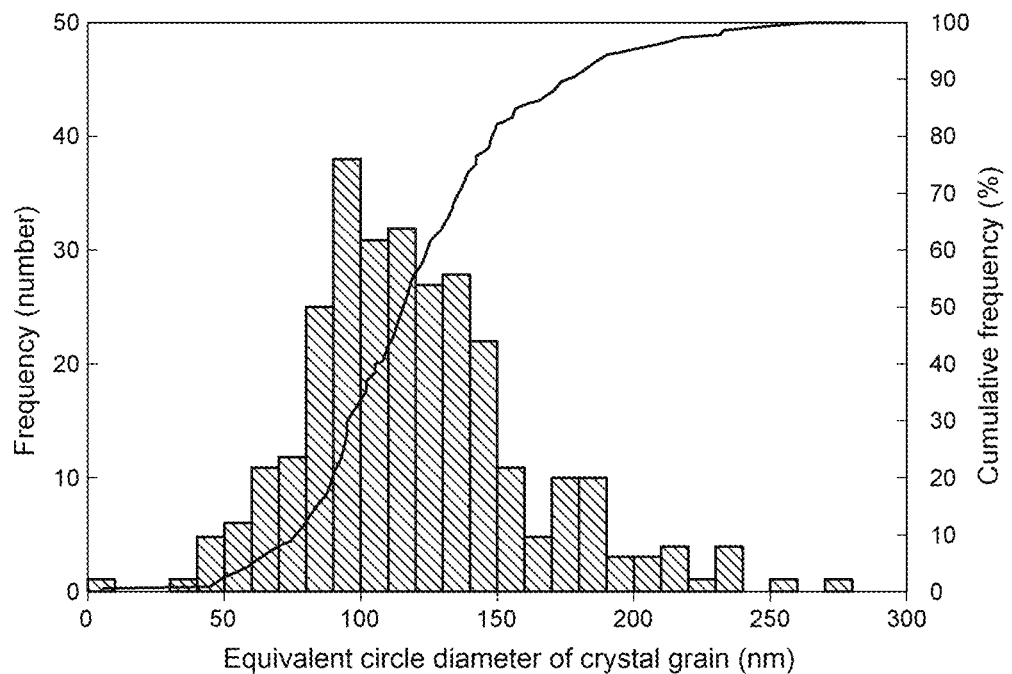
FIG. 12 is a graph showing the distribution of equivalent circle diameter of crystal grains of the sintered body obtained in Example 1, measured from FIG. 7 to FIG. 11.
Figure 13:
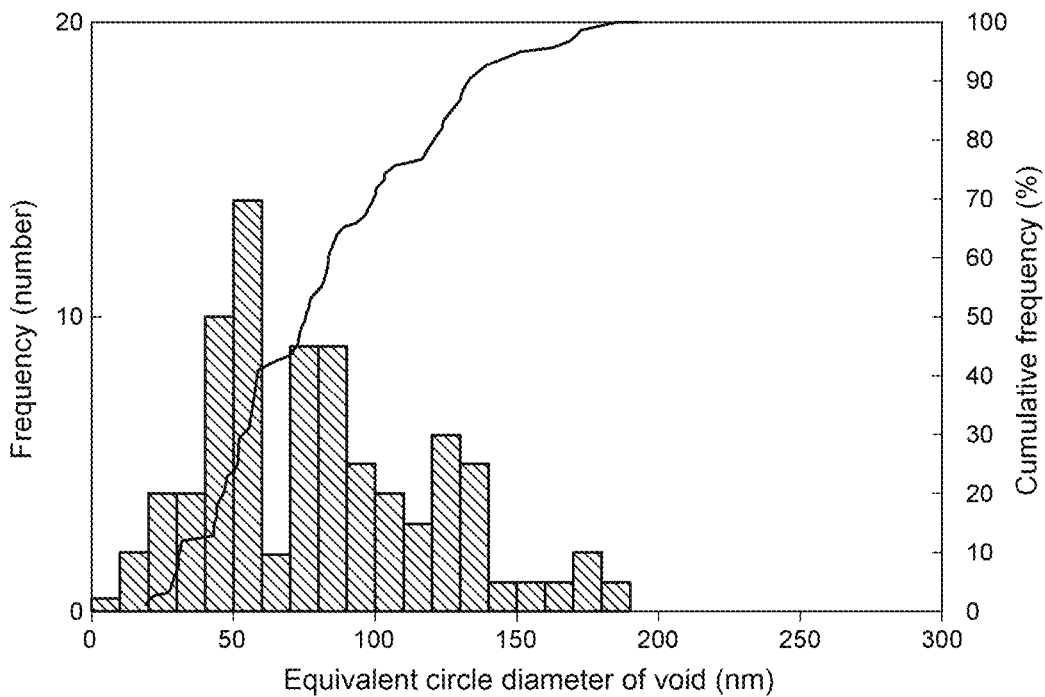
FIG. 13 is a graph showing the distribution of equivalent circle diameter of voids of the sintered body obtained in Example 1, measured from FIG. 7 to FIG. 11.
Figure 14:
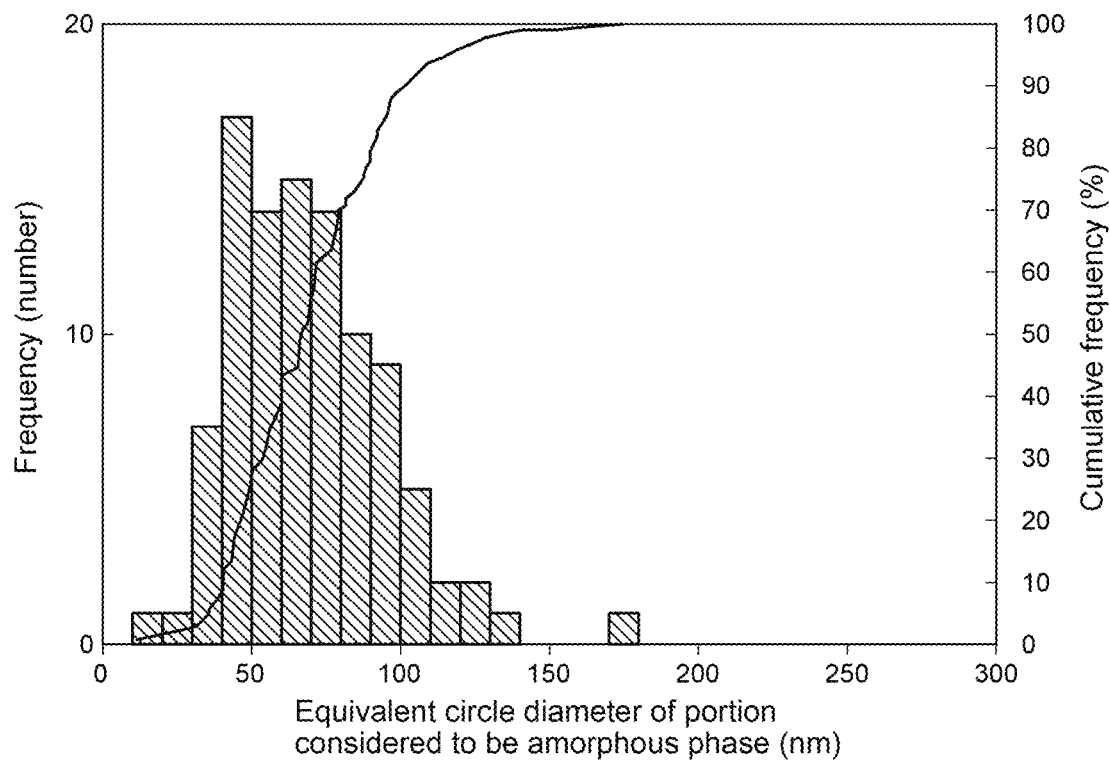
FIG. 14 is a graph showing the distribution of equivalent circle diameter of a portion considered to be an amorphous phase of the sintered body obtained in Example 1, measured from FIG. 7 to FIG. 11.

FIG. 12 is a graph showing the distribution of equivalent circle diameter of crystal grains. FIG. 13 is a graph showing the distribution of equivalent circle diameter of voids. FIG. 14 is a graph showing the distribution of the equivalent circle diameter of portions considered to be an amorphous phase.

Figure 15:
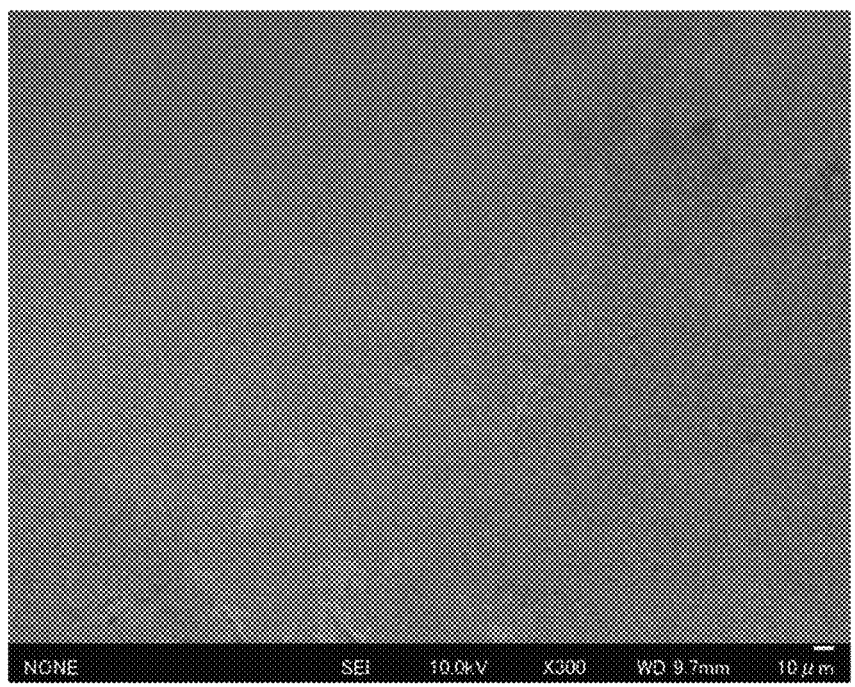
FIG. 15 is an SEM photograph of the sintered body obtained in Example 1 observed at a magnification of 300 times.
Figure 16:
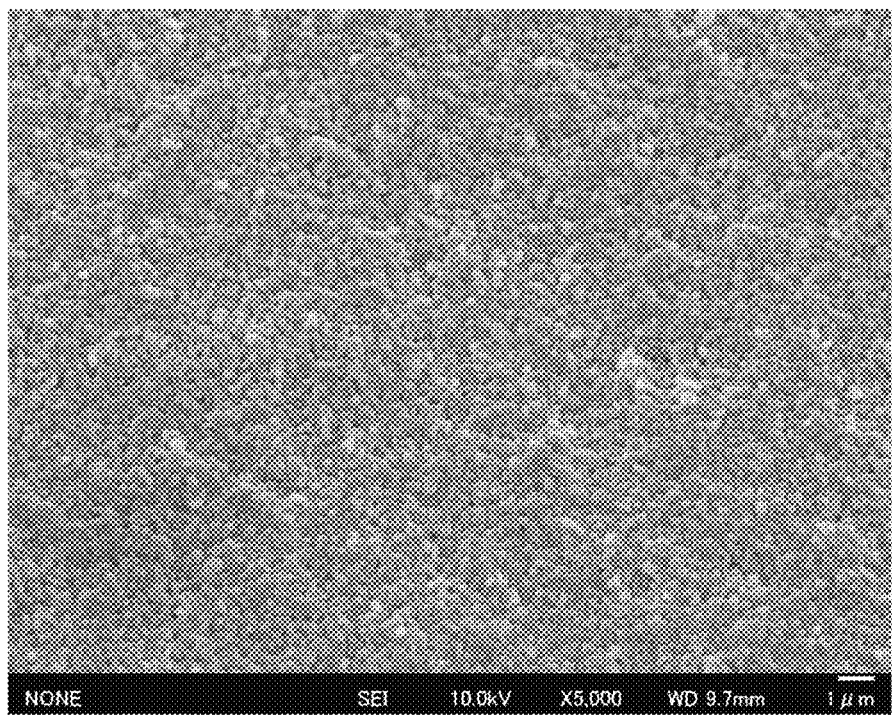
FIG. 16 is an SEM photograph of the sintered body obtained in Example 1 observed at a magnification of 5,000 times.

On the other hand, the sintered body was subjected to SEM observation at magnifications of 300 times and 5,000 times. FIG. 15 is an SEM photograph of the sintered body obtained in Example 1 observed at a magnification of 300 times. FIG. 16 is an SEM photograph of the sintered body obtained in Example 1 observed at a magnification of 5,000 times.

In both FIG. 15 and FIG. 16, no void exceeding a diameter of 10 μm was observed. In the SEM photograph of Patent Document 1 observed at a magnification of 300 times shown in FIG. 3, there were a large number of voids having a diameter of several tens of μm, whereas in the sintered body obtained in Example 1, the size of the voids was very small and about the same as the size of the oxynitride grains.

In FIG. 5 and FIG. 6 of Patent Document 1, there were regions of an amorphous phase having a diameter of several hundred nm. On the other hand, in Example 1, the size of the region considered to be an amorphous phase was also about the same as the size of the oxynitride grains.

As shown in FIG. 5 and FIG. 6 of Patent Document 1, the sintered body described in Patent Document 1 had a structure similar to a complex in which oxynitride grains are confined in a large amount of the amorphous phase. On the other hand, in the sintered body obtained in Example 1, portions where oxynitride grains are in close contact with each other without interposing the amorphous region occupy almost all of the sintered body. That is, it is found that there are many regions where the amorphous phase does not exist between the crystal grains, and as a result, the substantial degree of densification of the sintered body is effectively enhanced. In addition, since the sizes of the voids and the amorphous phase are equal to the size of the oxynitride grains, it is considered that the sizes of the voids and the amorphous phase also change depending on the size of the oxynitride raw material main body to be used. This phenomenon is considered to be caused by the fact that when sintering is performed by applying a mechanical pressure, sintering proceeds while the oxynitride grains are repeatedly rearranged due to the liquid phase of molten $BaCN_2$ and the pressure, leading to densification. It is considered that the oxynitride grains enter the void portion which is sufficiently larger than the oxynitride grains, and thus the size of the voids is reduced to the same extent as that of the oxynitride grains. In addition, $BaCN_2$ which has melted into the liquid phase remains in the void portion and then solidifies due to a temperature drop after completion of the sintering. Therefore, the size of the amorphous solidified product derived from $BaCN_2$ is considered to be about the same as that of the oxynitride grains. In addition, it is considered that, among $BaCN_2$ which has melted into the liquid phase, $BaCN_2$ distributed in the vicinity of the surface of the $BaTaO_2N$ grains dissolves $BaTaO_2N$ to form a crystalline layer of $Ba_2TaO_3N$.

The size of the oxynitride grains was about 100 nm in Example 1, but can be increased to about 1.0 μm by adjusting the composition and the production method. However, when a sintered body is produced using oxynitride grains having a size as large as 1.0 μm or more as a raw material, the void portion similarly increases to 1.0 μm or more, and it may be difficult to utilize the electrical characteristics of the oxynitride, or the mechanical strength may decrease.

(Diffuse Reflectance)

The sintered body obtained in Example 1 was pulverized using an agate mortar to obtain a powder. The obtained powder was measured for diffuse reflectance in the visible light region (400 nm to 800 nm).

Figure 17:
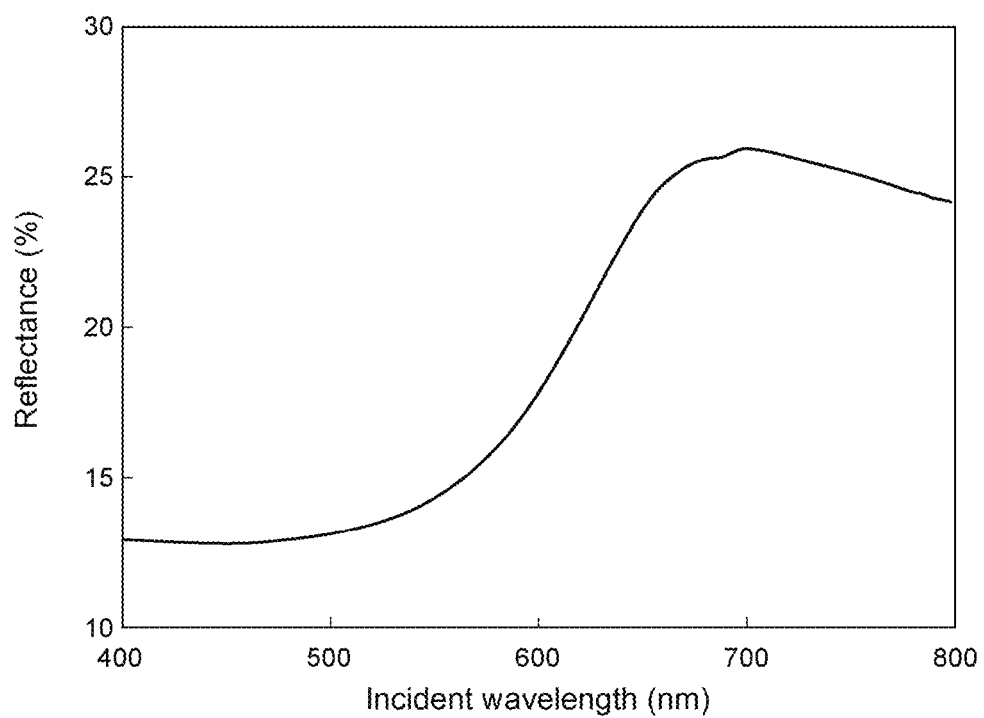
FIG. 17 is a graph showing the diffuse reflection spectrum of a powder obtained by pulverizing the sintered body obtained in Example 1, measured in a wavelength range of 400 nm to 800 nm.

FIG. 17 is a graph showing the diffuse reflection spectrum of a powder obtained by pulverizing the sintered body obtained in Example 1.

As is clear from FIG. 17, the minimum value of the reflectance in the visible light region is about 13%, and the maximum value thereof is about 26%.

In the black sintered body of the reference example, sintered at a high temperature of 1,400° C., the diffuse reflectance in the visible light region was almost constant at 10% to 13%. That is, the light absorption edge could not be confirmed.

(Volume Resistance)

Platinum (Pt) films were deposited on the upper surface and the lower surface of the sintered body obtained in Example 1. Then, the volume resistance at a temperature of −50° C. to 150° C. was measured at each frequency in a range of 100 Hz to 1 MHz. The results are shown in FIG. 18.

Figure 18:
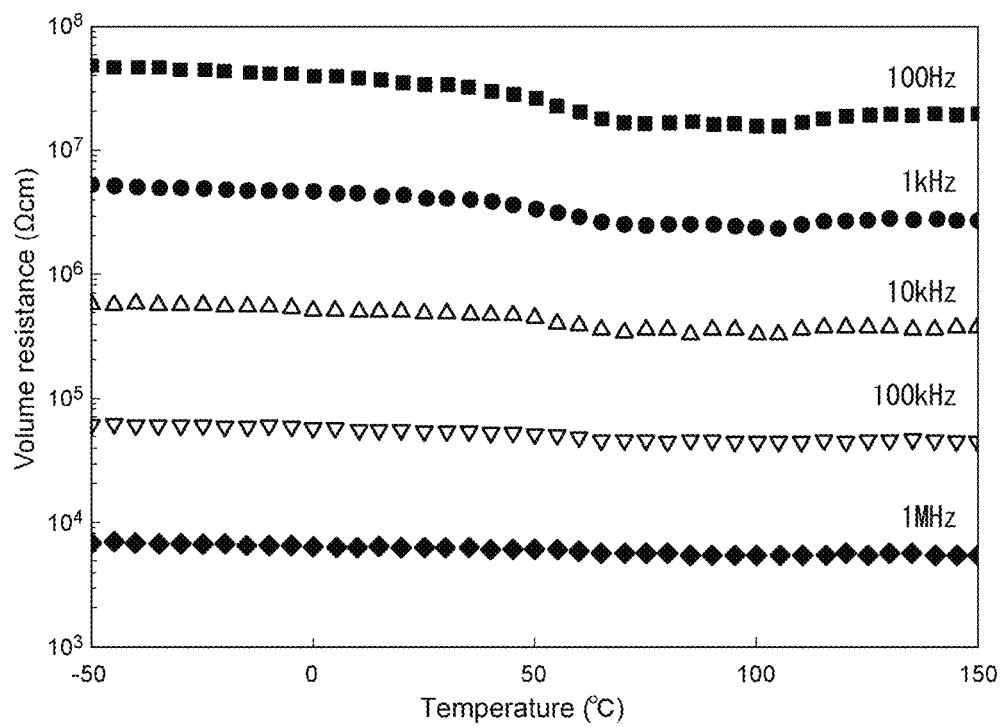
FIG. 18 is a graph showing the relationship between the temperature and the volume resistance of the sintered body obtained in Example 1, measured at a plurality of frequencies in a range of 100 Hz to 1 MHz and a temperature in a range of −50° C. to 150° C.

FIG. 18 is a graph showing the relationship between the temperature and the volume resistance of the sintered body of Example 1 at a plurality of frequencies in a range of 100 Hz to 1 MHz.

As is clear from FIG. 18, the volume resistance was on the order of $10^7$ Ωcm at 100 Hz, but the volume resistance decreased as the frequency increased. The volume resistance was on the order of $10^3$ Ωcm at 1 MHz. With respect to the temperature, inflection points were slightly observed in the vicinity of 60° C. and the vicinity of 100° C. only at 10 kHz.

(Dielectric Properties)

Figure 19:
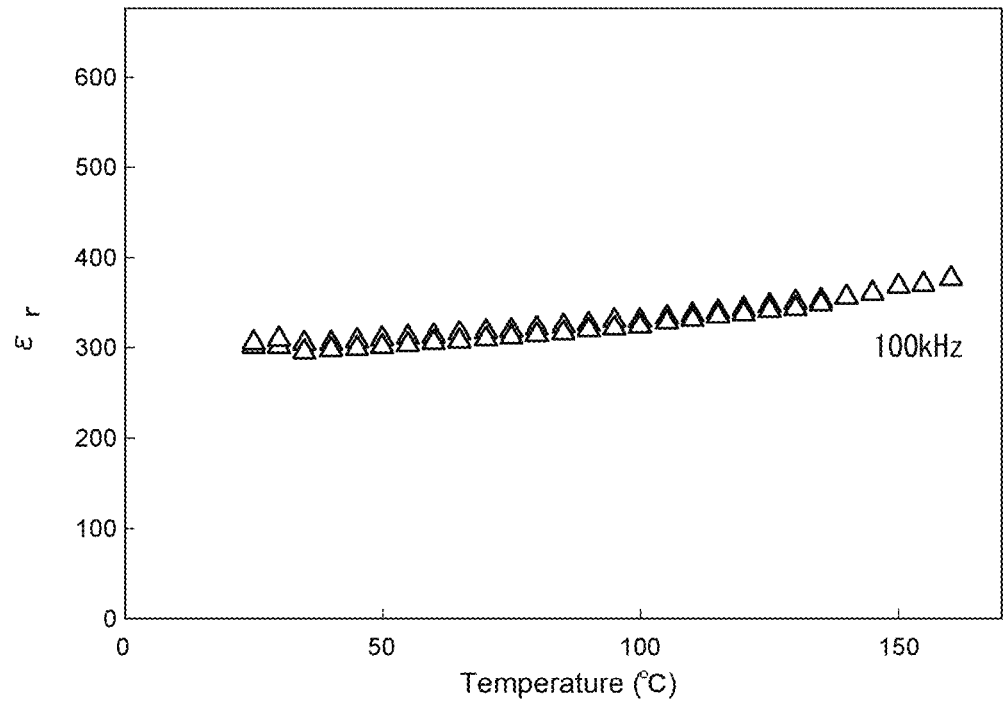
FIG. 19 is a graph showing the relationship between the temperature and the relative permittivity (εr) of the sintered body obtained in Example 1, measured at a frequency of 100 kHz and a temperature in a range of 30° C. to 160° C.
Figure 20:
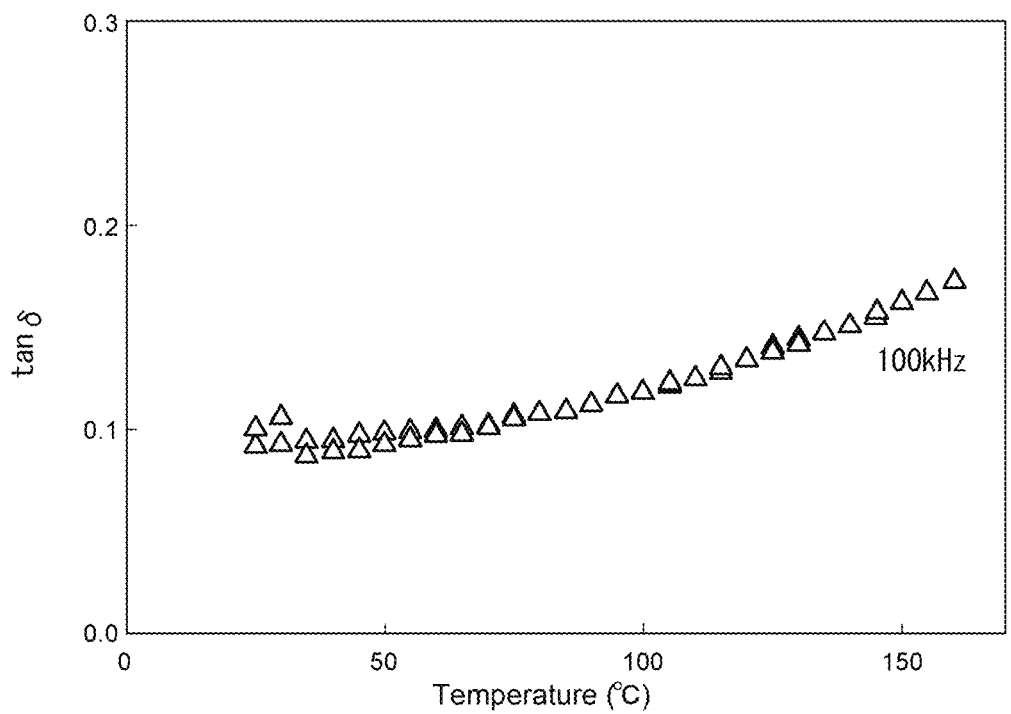
FIG. 20 is a graph showing the relationship between the temperature and the dielectric loss (tan δ) of the sintered body obtained in Example 1, measured at a frequency of 100 kHz and a temperature in range of 30° C. to 160° C.

The dielectric properties of the sintered body obtained in Example 1 were measured at a frequency of 100 kHz in a temperature range of 25° C. to 160° C. The results are shown in FIG. 19 and FIG. 20. FIG. 19 is a graph showing the relationship between the temperature and the relative permittivity of the sintered body obtained in Example 1. FIG. 20 is a graph showing the relationship between the temperature and the dielectric loss tan δ of the sintered body obtained in Example 1.

As can be seen from FIG. 19, the value of the relative permittivity was between 300 and 380 in the above temperature range. The value of tan δ was between 0.08 (8%) and 0.17 (17%) in this temperature range.

Figure 21:
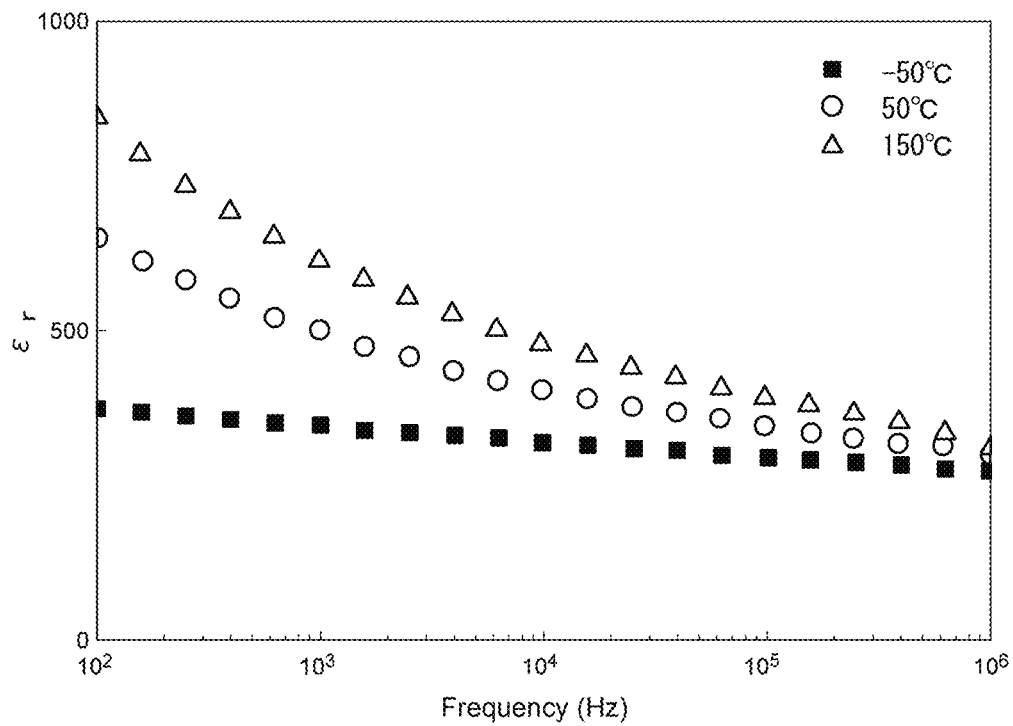
FIG. 21 is a graph showing the relationship between the temperature and the relative permittivity (εr) of the sintered body obtained in Example 1, measured at a frequency of 100 Hz to 1 MHz and temperatures of −50° C., 50° C., and 150° C.
Figure 22:
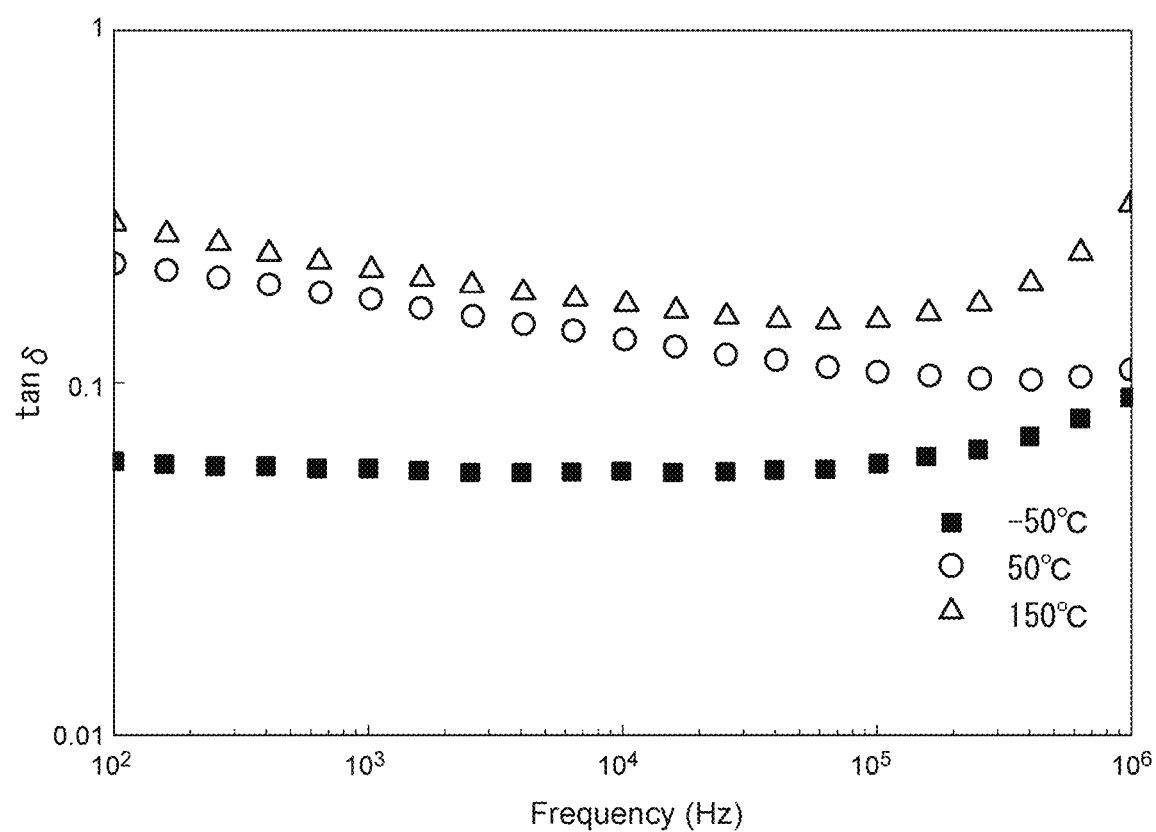
FIG. 22 is a graph showing the relationship between the temperature and the dielectric loss (tan δ) of the sintered body obtained in Example 1, measured at a frequency of 100 Hz to 1 MHz and temperatures of −50° C., 50° C., and 150° C.

FIG. 21 is a graph showing the relationship between the temperature and the relative permittivity measured in a frequency of 100 Hz to 1 MHz and at temperatures of −50° C., 50° C., and 150° C., and FIG. 22 is a graph showing the relationship between the temperature and the dielectric loss tan δ.

As is apparent from FIG. 21, the relative permittivity is 200 to 850 in this frequency range. In the sintered body of Example 1 described in Patent Document 1, the relative permittivity was only about several tens to 200. Therefore, it is found that the relative permittivity of the sintered body obtained in Example 1 is remarkably high. This is considered to be because the proportion of the oxynitride in the sintered body is increased.

On the other hand, as shown in FIG. 22, when measurement was performed in this frequency range, tan δ fell within a range of 0.05 (5%) to 0.35 (35%). The tan δ was equivalent to that of the sintered body of Example described in Patent Document 1. Consequently, in the sintered body of Example 1, the relative permittivity is increased, and on the other hand, the tan δ is suppressed to be low.

(Characteristics of Sintered Body Obtained in Example 1)

As described above, it is considered that the oxynitride grains were partially dissolved in the molten $BaCN_2$ by performing sintering while applying a mechanical pressure, and as a result, the volume of the crystal phase was reduced. Therefore, it is considered that rearrangement of crystal grains and densification of the entire powder phase were promoted.

In addition, the O content and the N content in the mixed powder before sintering were substantially equal to the O content and the N content in the sintered body. In the conventional method for sintering an oxynitride, a large amount of N is desorbed along with thermal decomposition, and anion deficiency may occur, or different phases such as an oxide phase and a carbide phase may be generated. Therefore, the absorption rate in the visible light region was increased, and the sintered body was changed to black.

On the other hand, the sintered body obtained in Example 1 exhibited a reddish brown color. In addition, a variation in reflectance in the visible light region was observed in the diffuse reflection spectrum. That is, the result indicates that a band gap exists in the visible light region. The presence of the band gap in the visible light region is one of characteristics of the perovskite-type oxynitride. Therefore, it is possible to provide a sintered body suitable for applications such as the above-described photocatalyst and solar cell.

Furthermore, in the sintered body obtained in Example 1, the amount of $BaCN_2$ added can be reduced by performing sintering while applying a mechanical pressure. Therefore, remaining of large voids was suppressed. In addition, after $BaCN_2$ was dissolved, the amount of $BaCN_2$ gradually volatilized is also decreased. Therefore, in Patent Document 1, as described above, a large number of large voids remained, whereas in Example 1, the size of voids was equivalent to that of the oxynitride grains. This is considered to be because rearrangement of crystal grains proceeded and volatilization of $BaCN_2$ was suppressed.

In the sintered body obtained in Example 1, the proportion of the oxynitride phase in the sintered body is high. This is considered to be because $BaCN_2$ gradually oozes out of the green compact layer and is discharged by performing sintering while being pressurized. Also due to this effect, it is considered that not only the proportion of the oxynitride grains in the sintered body is increased, but also the volume of the amorphous phase derived from $BaCN_2$ is significantly decreased.

As described above, the fact that the Ba content in the triple point is high and that a small amount of Ta is contained in the triple point as compared with the inside of the crystal grain means that the liquid phase component of molten $BaCN_2$ remains in the triple point and solidifies, and that $BaTaO_2N$ is dissolved in the liquid phase of $BaCN_2$. Such a region having a high Ba concentration and a low Ta concentration was not observed on the contact surface between the grains, and was observed only at the triple point, that is, the minimum void portion. Therefore, $BaCN_2$ can be added only in an amount necessary for sintering the liquid phase of the oxynitride phase. In addition, it is considered that excessive $BaCN_2$ is discharged to the outside of the green compact layer with pressurization. It is also considered that the oxynitride grains are brought into contact with each other by sufficient pressurization, and the oxynitride grains are further deformed accompanying dissolution and reprecipitation. As a result, it is considered that the oxynitride grains are in surface contact with each other as described above.

In Example 1 described above, no peaks of oxides, carbides, nitrides, and carbonates were observed in the XRD pattern of the sintered body. The result indicates that the purity of the oxynitride in the sintered body obtained in Example 1 is high.

In the sintered body obtained in Example 1, in which the number of voids is small, the proportion of the oxynitride phase is high, and no anion deficiency occurs, the characteristics that the oxynitride phase essentially has can be effectively utilized. For example, the volume resistance at room temperature and 100 kHz is as high as about 30 Mom. In addition, as described above, the relative permittivity is remarkably increased as compared with the sintered body obtained in Examples described in Patent Document 1, and the dielectric loss is also reduced to about 10 to 20%. Therefore, the sintered body obtained in Example 1 is more effective as a dielectric ceramic material, that is, a capacitor application than the sintered body of Examples described in Patent Document 1. In addition, since the proportion of the oxynitride phase is high, it can be suitably used for a photocatalyst, a solar cell, a gas sensor, or the like.

Examples 2 to 12, Comparative Examples 1 to 4

Production of the sintered bodies of Examples 2 to 12 and Comparative Examples 1 to 4 was attempted by changing the composition of the used oxynitride powder, the amount of $BaCN_2$ added, the pressure during sintering, the atmosphere, the sintering temperature, the temperature raising rate, and the retention time as shown in Table 2 below.

TABLE 2

| | Composition of oxynitride | $BaCN_2$ content wt % | Pressure MPa | Sintering temperature °C. | Temperature raising rate °C./min | Retention time min | Solidified or not | Degree of densification of oxynitride phase % | Anion deficiency |
|---|---|---|---|---|---|---|---|---|---|
| Example 2 | $BaTaO_2N$ | 5 | 30 | 900 | 50 | 1 | Solidified | 68.7 | No |
| Example 3 | $BaTaO_2N$ | 5 | 70 | 900 | 50 | 1 | Solidified | 80.7 | No |
| Example 4 | $BaTaO_2N$ | 5 | 70 | 900 | 50 | 3 | Solidified | 79.8 | No |
| Example 5 | $BaTaO_2N$ | 5 | 70 | 900 | 50 | 5 | Solidified | 84.1 | No |
| Example 6 | $BaTaO_2N$ | 5 | 100 | 900 | 50 | 3 | Solidified | 80.1 | No |
| Example 7 | $BaTaO_2N$ | 7 | 30 | 900 | 50 | 3 | Solidified | 66.5 | No |
| Example 8 | $BaTaO_2N$ | 7 | 70 | 900 | 50 | 3 | Solidified | 72.1 | No |
| Example 9 | $BaTaO_2N$ | 7 | 100 | 900 | 50 | 3 | Solidified | 76.9 | No |
| Example 10 | $BaTaO_2N$ | 10 | 30 | 900 | 50 | 3 | Solidified | 70.5 | No |
| Example 11 | $BaTaO_2N$ | 10 | 100 | 900 | 50 | 3 | Solidified | 82.4 | No |
| Example 12 | $SrTaO_2N$ | 10 | 100 | 900 | 50 | 10 | Solidified | 97.0 | No |
| Comparative Example 1 | $BaTaO_2N$ | 0 | 30 | 900 | 50 | 10 | Green compact-like | Not measurable (easily broken) | Yes |
| Comparative Example 2 | $BaTaO_2N$ | 0 | 100 | 900 | 50 | 10 | Green compact-like | Not measurable (easily broken) | Yes |
| Comparative Example 3 | $BaTaO_2N$ | 10 | 0 | 900 | 50 | 1800 | Solidified | 54.0 | Yes |
| Comparative Example 4 | $BaTaO_2N$ | 10 | 35 | 930 | 10 | 60 | Solidified | 77.1 | Yes |

The $SrTaO_2N$ powder was synthesized in the same manner as in Example 1 described in Patent Document 1.

Results of Examples 2 to 12

In Examples 2 to 12, sintered bodies in which no anion deficiency occurred could be obtained as in Example 1. That is, blackening or resistance reduction of the sintered body did not occur.

Figure 23:
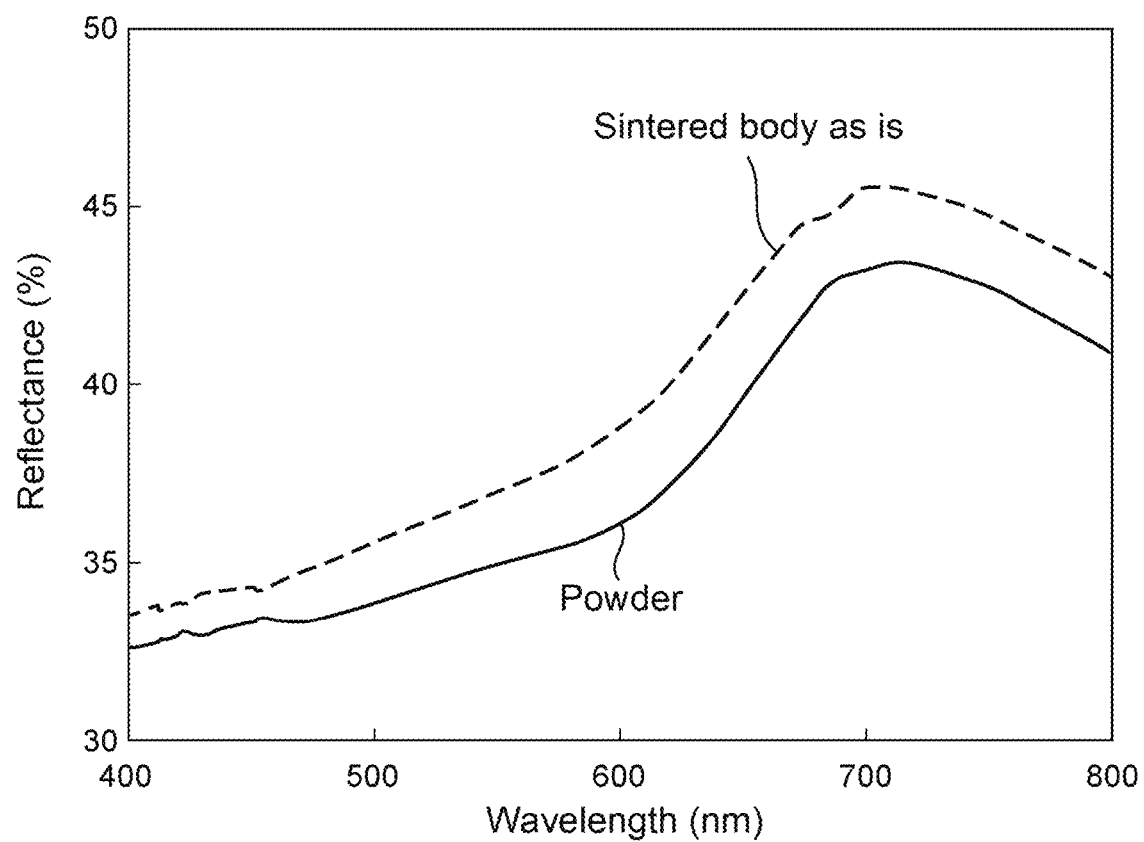
FIG. 23 is a graph showing the diffuse reflection spectra of a sintered body obtained in Example 2 and a powder obtained by pulverizing the sintered body, measured in a wavelength range of 400 nm to 800 nm.

FIG. 23 is a graph showing the diffuse reflection spectra of the sintered body obtained in Example 2 and a powder obtained by pulverizing the sintered body. The solid line indicates the measurement result of the powder prepared by pulverizing the sintered body, and the broken line indicates the measurement result of the sintered body as it is. From the spectrum of the powder, the diffuse reflectance in the visible light region changed around 32.5% to 43.5%, and the difference between the maximum value and the minimum value was about 11.0%.

When the composition of the oxynitride was $SrTaO_2N$, a good sintered body was obtained as in Example 1 as long as the amount of $BaCN_2$ added was 5 wt % to 10 wt %, and the retention time was 10 minutes or less.

In Examples 2 to 12, pressure sintering was performed in the same manner as in Example 1. Therefore, there was no large void in the obtained sintered body, and good electrical properties were obtained. However, the relative permittivity depends on the degree of densification. Accordingly, when the degree of densification of the obtained sintered body was low as in Example 7, the permittivity was lower than that in Example 1. In addition, in the sintered body of Examples using $SrTaO_2N$, similar sintered bodies were obtained even when the retention time was extended to 10 minutes. This is considered to be because $SrTaO_2N$ has a higher temperature at which anion deficiency occurs due to partial desorption of N than $BaTaO_2N$. In particular, in Example 12, a hard sintered body having an extremely high density of 97% in the degree of densification and no anion deficiency was obtained. When there is no anion deficiency in the sintered body made of $SrTaO_2N$, the color tone is orange.

Comparative Examples 1 to 4

In Comparative Examples 1 and 2 in which no $BaCN_2$ was added, solidification did not occur.

In Comparative Examples 3 and 4, in which the retention time was as long as 10 minutes or more, solidification occurred, but anion deficiency occurred.

In Comparative Example 3, in which densification was attempted by performing sintering for a long time without pressurization, the degree of densification of the obtained sintered body was only 54%, and was hardly densified. Anion deficiency also occurred.

In Comparative Example 4, the retention time was shortened to 60 minutes instead of applying a mechanical pressure as compared with Comparative Example 3. Although the degree of densification was improved to 77%, anion deficiency occurred.

Comparison between Examples and Comparative Examples shows that in order to produce a dense sintered body while avoiding the formation of anion deficiency due to partial desorption of N of the metal oxynitride, it is necessary to add cyanamide, heat the sintered body while applying a mechanical pressure, and set the retention time at the maximum heating temperature to a short time (1 minute to 10 minutes).

The invention claimed is:

1. A sintered body comprising:
polycrystalline grains of a metal oxynitride containing at least two metal elements,
wherein Ba and at least one metal element of a crystal phase of the sintered body are contained in a triple point that is not a void between the polycrystalline grains.

2. The sintered body according to claim 1, wherein a concentration ratio between the Ba and the metal element in the triple point is higher than a concentration ratio between Ba and the metal element in the polycrystalline grains.

3. The sintered body according to claim 1, wherein the sintered body contains a portion where the polycrystalline grains are in surface contact with each other.

4. The sintered body according to claim 3, wherein a grain boundary portion where the polycrystalline grains are in surface contact with each other does not have an amorphous phase.

5. The sintered body according to claim 1, wherein an equivalent circle average size of voids in the sintered body is 1.0 µm or less.

6. The sintered body according to claim 1, wherein an equivalent circle diameter of a region excluding voids in a portion of the sintered body other than the polycrystalline grains is 1.0 µm or less.

7. The sintered body according to claim 1, wherein a degree of densification of the oxynitride grains in the sintered body is 55% or more.

8. The sintered body according to claim 1, wherein 90% or more of a crystal phase of the oxynitride, estimated from a diffraction peak intensity ratio of an X-ray diffraction pattern, is a perovskite structure represented by $AB(O,N)_3$.

9. The sintered body according to claim 1, the sintered body comprises 0 wt % to 10 wt % of a composite metal oxynitride phase represented by $A_2BO_{4-x}N_x$, where x is greater than 0.

10. The sintered body according to claim 1, wherein a crystalline metal oxide phase, a metal carbide phase, and a metal oxynitride phase are not contained in the sintered body.

11. The sintered body according to claim 10, wherein the composite metal oxynitride phase contains at least one of an alkaline earth metal or La as a constituent element thereof.

12. The sintered body according to claim 11, wherein the alkaline earth metal is at least one of Ba, Sr, or Ca, and the composite metal oxynitride phase contains at least one of Ba, Sr, Ca, or La.

13. The sintered body according to claim 10, wherein the composite metal oxynitride contains Ta as a constituent element thereof.

14. The sintered body according to claim 1, wherein, in a diffuse reflection spectrum of a powder obtained by pulverizing the sintered body, a difference between a maximum value and a minimum value in a wavelength range of 400 nm to 800 nm is 10% to 50%.

15. The sintered body according to claim 1, wherein a direct-current volume resistance in the sintered body is $10^6$ Ωcm or more.

16. A dielectric composition comprising the sintered body according to claim 1, wherein the sintered body has a relative permittivity of 200 or more when an electric field of 100 Hz to 1 MHz is applied in a temperature range of −50° C. to 150° C.

17. A capacitor comprising:
the dielectric composition according to claim 16; and
at least a pair of electrodes facing each other with the dielectric composition interposed between the pair of electrodes.

18. A dielectric composition comprising the sintered body according to claim 1, wherein the sintered body has a rate of change in relative permittivity within ±10% when an electric field of 100 kHz is applied due to a temperature change in a temperature range of 30°° C. to 150° C.

19. A photocatalytic composition comprising the sintered body according to claim 1.

20. A photoelectric conversion element comprising the sintered body according to claim 1.

21. A gas sensor comprising the sintered body according to claim 1.

* * * * *